United States Patent
Yun et al.

(10) Patent No.: US 11,031,977 B2
(45) Date of Patent: *Jun. 8, 2021

(54) SIGNAL TRANSMISSION/RECEPTION METHOD IN WIRELESS LAN SYSTEM, AND DEVICE THEREFOR

(71) Applicant: LG ELECTRONICS INC., Seoul (KR)

(72) Inventors: Sunwoong Yun, Seoul (KR); Jinmin Kim, Seoul (KR); Sungjin Park, Seoul (KR); Jinsoo Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/867,097

(22) Filed: May 5, 2020

(65) Prior Publication Data

US 2020/0266858 A1 Aug. 20, 2020

Related U.S. Application Data

(63) Continuation of application No. 16/476,518, filed as application No. PCT/KR2019/003883 on Apr. 2, 2019, now Pat. No. 10,680,683.

(30) Foreign Application Priority Data

May 2, 2018 (KR) .................. 10-2018-0050513
May 3, 2018 (KR) .................. 10-2018-0051156

(51) Int. Cl.
*H04B 7/0417* (2017.01)
*H04B 7/0452* (2017.01)
(Continued)

(52) U.S. Cl.
CPC ......... *H04B 7/0417* (2013.01); *H04B 7/0452* (2013.01); *H04B 7/0617* (2013.01); *H04W 84/12* (2013.01)

(58) Field of Classification Search
CPC .. H04B 7/0413; H04B 7/0417; H04B 7/0421; H04B 7/0452; H04B 7/0617;
(Continued)

(56) References Cited

U.S. PATENT DOCUMENTS 9,332,449 B2 5/2016 Park et al.
10,680,683 B2 * 6/2020 Yun .................. H04B 7/0658
(Continued)

FOREIGN PATENT DOCUMENTS

JP 2008517566 5/2008
JP 2015080230 4/2015
(Continued)

OTHER PUBLICATIONS

Korean Intellectual Property Office Application No. 10-2019-7016926, Notice of Allowance dated Feb. 18, 2020, 3 pages.
(Continued)

*Primary Examiner* — Siu M Lee
(74) *Attorney, Agent, or Firm* — Lee Hong Degerman Kang Waimey

(57) ABSTRACT

Proposed are a method and apparatus for transmitting a feedback frame in a wireless local area network (WLAN) system. Specifically, a first STA generates the feedback frame based on multi user (MU)-multi input multi output (MIMO) beamforming. The first STA transmits the feedback frame to a second STA. The feedback frame includes information related to a feedback subcarrier for a predetermined frequency band and a beamforming report field for the MU-MIMO beamforming. The feedback subcarrier includes a first subcarrier transmitted first in the feedback subcarrier
(Continued)

and a second subcarrier of which a subcarrier index is determined based on a grouping value related to a subcarrier spacing. The beamforming report field includes a first signal to noise ratio (SNR) for the first subcarrier and a first differential SNR for the second subcarrier. The first differential SNR is an SNR difference between adjacent subcarriers included in the feedback subcarrier.

9 Claims, 21 Drawing Sheets

(51) Int. Cl.
  *H04B 7/06* (2006.01)
  *H04W 84/12* (2009.01)
(58) Field of Classification Search
  CPC .. H04B 7/0619; H04B 7/0621; H04B 7/0632; H04B 7/0636; H04B 7/0658; H04B 7/0695; H04B 7/088; H04W 84/12
  See application file for complete search history.

(56) References Cited

U.S. PATENT DOCUMENTS

| | | | |
|---|---|---|---|
| 2008/0056181 A1* | 3/2008 | Imamura | H04L 1/0026 370/329 |
| 2012/0140753 A1* | 6/2012 | Lee | H04L 1/1812 370/338 |
| 2014/0098701 A1 | 4/2014 | Sohn et al. | |
| 2014/0301240 A1* | 10/2014 | Park | H04B 7/0658 370/253 |
| 2015/0117325 A1* | 4/2015 | Ponnuswamy | H04L 5/0082 370/329 |
| 2016/0330732 A1 | 11/2016 | Moon et al. | |
| 2017/0054542 A1 | 2/2017 | Vermani et al. | |
| 2017/0111924 A1 | 4/2017 | Josiam et al. | |
| 2017/0127385 A1 | 5/2017 | Vermani et al. | |
| 2017/0171860 A1* | 6/2017 | Park | H04W 72/0453 |
| 2017/0272138 A1* | 9/2017 | Chun | H04L 69/323 |
| 2019/0068258 A1 | 2/2019 | Oteri et al. | |
| 2019/0273535 A1 | 9/2019 | Yun et al. | |
| 2020/0154470 A1* | 5/2020 | Zhang | H04W 74/002 |

FOREIGN PATENT DOCUMENTS

| | | |
|---|---|---|
| WO | 2006028204 | 3/2006 |
| WO | 2013077688 | 5/2013 |
| WO | 2017030295 | 2/2017 |

OTHER PUBLICATIONS

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz; IEEE Std 802.11ac™—2013, 424 pages.
LG Electronics et al., "CR on Hybrid Beamforming feedback", IEEE 802.11-18/0441r0, Mar. 2018, 14 pages.
LG Electronics et al., "Tone grouping size for hybrid beamforming feedback in OFDM mode", IEEE 802.11-18/382r0, Mar. 2018, 11 pages.
LG Electronics, "MU Exclusive Beamforming Report field", IEEE 802.11-18/0850r0, May 2018, 3 pages.
PCT International Application No. PCT/KR2019/003883, International Search Report dated Jul. 11, 2019, 3 pages.
Huang, L. et al., "Comment Resolution on MIMO BF misc", IEEE P802.11 Wireless LANs, doc.: IEEE 802.11-18/0610r1, Apr. 2018, 15 pages.
Uteri, K. et al., "Hybrid Beamforming Feedback in 802.11ay", doc.: IEEE 802.11-18/0192r1, Jan. 2018, 15 pages.
U.S. Appl. No. 16/476,518, Ex-Parte Quayle Office Action dated Oct. 9, 2019, 10 pages.
U.S. Appl. No. 16/476,518, Notice of Allowance Office Action dated Oct. 9, 2019, 10 pages.
IEEE Std 802.11acTM—2013 (Dec. 18, 2013) See section 8.4.1.48, 8.4.1.49 and pp. 53-68. (Year: 2013).
Sunwoong Yun et al, "CR on Hybrid Beamforming feedback", IEE 802.11-18/0441r0, Mar. 2018 (Mar. 8, 2018) See whole document. (Year: 2018).
Sunwoong Yun et al, "Tone grouping size for hybrid beamforming feedback in OFDM mode", IEE 802.11-18/382r0, Mar. 2018 (Mar. 5, 2018) See whole document. (Year: 2018).
Sunwoong Yun et al, "MU Exclusive Beamforming Report filed", IEE 802.11-18/0850r0, May 2018 (May 7, 2018) See whole document. (Year: 2018).
KIPO Search Report for KR 10-2019-7016926 dated Sep. 24, 2019.
European Patent Office Application Serial No. 19731582.3, Search Report dated Feb. 10, 2020, 6 pages.
Japan Patent Office Application No. 2019-570490, Office Action dated Mar. 2, 2021, 6 pages.
Intellectual Property Office of India Application Serial No. 201937049302, Office Action dated Mar. 8, 2021, 7 page.

* cited by examiner

FIG. 9

| CH 1 | L-STF | L-CE | L-Header | ay Header A | ay STF | ay CE | ay Header B | ay payload |
|---|---|---|---|---|---|---|---|---|
|  | GF-STF | GF-CE |  |  |  |  |  |  |
| CH 2 | L-STF | L-CE | L-Header | ay Header A |  |  |  |  |

(L: Legacy, GF: Gap Filling, ay: 802.11ay)

FIG. 16

| Nc Index | Nr Index | Tx Antenna Mask | Ncb | Grouping | Codebook Information | Feedback Type | Number of Feedback Matrices or Feedback Taps |
|---|---|---|---|---|---|---|---|
| 3 | 3 | 8 | 2 | 2 | 1 | 1 | 10 |

Bits:

SIGNAL TRANSMISSION/RECEPTION METHOD IN WIRELESS LAN SYSTEM, AND DEVICE THEREFOR

CROSS-REFERENCE TO RELATED APPLICATIONS

This application is a continuation of U.S. patent application Ser. No. 16/476,518, filed on Jul. 8, 2019, now U.S. Pat. No. 10,680,683, which is the National Stage filing under 35 U.S.C. 371 of International Application No. PCT/KR2019/003883, filed on Apr. 2, 2019, which claims the benefit of earlier filing date and right of priority to Korean Application Nos. 10-2018-0050513, filed on May 2, 2018, and 10-2018-0051156, filed on May 3, 2018, the contents of which are all incorporated by reference herein in their entirety.

BACKGROUND OF THE INVENTION

Field of the Invention

The present specification relates to a technique for transmitting/receiving a signal in a wireless local area network (LAN) system, and more particularly, to a method and apparatus for transmitting a feedback frame by performing multi input multi output (MIMO) beamforming.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY OF THE INVENTION

The present specification proposes a method and apparatus for transmitting a feedback frame by performing multi input multi output (MIMO) beamforming in a wireless local area network (WLAN) system.

The present specification propose a method and apparatus for transmitting a feedback frame to perform MIMO beamforming.

The present embodiment proposes a method of configuring an additional report field for MU-MIMO beamforming in a compressed beamforming feedback process during a hybrid beamforming procedure. Conventionally, the report field to be added includes a difference between a signal to noise ratio (SNR) per feedback subcarrier and an average SNR value. However, the present embodiment proposes a method of decreasing the number of bit for a feedback by including a differential SNR which is a difference between adjacent subcarriers.

First, summarizing terminologies, a first station (STA) may correspond to a responder for performing MIMO beamforming, and a second STA may correspond to an initiator for performing MIMO beamforming. Since the MIMO beamforming described in the present embodiment relates to multi user (MU)-MIMO beamforming, a plurality of first STAs may be present. A subcarrier may correspond to a tone.

The first STA generates a feedback frame based on multi user (MU)-multi input multi output (MIMO) beamforming. The MIMO beamforming may include a sounding procedure for transmitting/receiving a beam refinement protocol or beam refinement phase (BRP) packet (or frame).

The feedback frame is transmitted to the second STA.

The feedback frame may be defined as follows.

The feedback frame includes information related to a feedback subcarrier for a predetermined frequency band and a beamforming report field for the MU-MIMO beamforming.

The feedback subcarrier includes a first subcarrier transmitted first in the feedback subcarrier and a second subcarrier of which a subcarrier index is determined based on a grouping value related to a subcarrier spacing. The second subcarrier may be a feedback subcarrier excluding the first subcarrier.

The first subcarrier is set to one of a left edge subcarrier or right edge subcarrier of the predetermined frequency band.

The beamforming report field includes a first signal to noise ratio (SNR) for the first subcarrier and a first differential SNR for the second subcarrier.

The first differential SNR is an SNR difference between adjacent subcarriers included in the feedback subcarrier.

That is, the first SNR for the first subcarrier cannot be set to the differential SNR since the first subcarrier does not have a comparison target. Therefore, the SNR value may be fed back for the first subcarrier, and the differential SNR may be fed back from the second subcarrier which is a feedback subcarrier excluding the first subcarrier. That is, the feedback subcarrier included in the second subcarrier is used to feed back the SNR difference between the adjacent subcarriers, thereby decreasing the number of feedback bits.

Specifically, the first SNR may be acquired for a space-time stream by using the equation below.

$$D\_SNR_{scidx(0),i} = 10\log_{10}\left(\frac{\|H_{scidx(0)}V_{scidx(0),i}\|^2}{N}\right)$$

$H_{scidx(0)}$ may be an estimated MIMO channel for the first subcarrier.

$V_{scidx(0),i}$ may be a column i of a beamforming matrix V for the first subcarrier.

i may be an index of the space-time stream.

N may be an average noise plus interference power, measured from the first STA.

scidx(0) is a first subcarrier index which may be expressed as a subcarrier index 1, and may be a subcarrier index of the first subcarrier.

The first SNR may have a granularity of 0.25 dB, a minimum value of −8 dB, and a maximum value of 55.75 dB. The first SNR may be quantized with 8 bits based on the granularity, the minimum value, and the maximum value. The first SNR may be indicated by a value in the range of −8 dB to 55.75 dB with a 0.25 dB step by using the 8 bits.

The first differential SNR may be acquired for a space-time stream based on the equation below.

$$D_{SNR_{k,i}} = 10\log_{10}\left(\frac{\|H_k V_{k,i}\|^2}{N}\right) - 10\log_{10}\left(\frac{\|H_{k-1} V_{k-1,i}\|^2}{N}\right)$$

k may be a subcarrier index of the second subcarrier.

$H_k$ may be an estimated MIMO channel for a feedback subcarrier k.

$V_{k,i}$ may be a column i of a beamforming matrix V for the feedback subcarrier k.

i may be an index of the space-time stream.

N may be an average noise plus interference power, measured from the first STA.

The first differential SNR may have a granularity of 1 dB, a minimum value of −8 dB, and a maximum value of 7 dB. The first differential SNR may be quantized with 4 bits based on the granularity, the minimum value, and the maximum value. The first differential SNR may be indicated by a value in the range of −8 dB to 7 dB with a 1 dB step by using the 4 bits An embodiment of the first differential SNR is described below in detail.

If a subcarrier index of the first subcarrier is 1, the second subcarrier may include a third subcarrier of which a subcarrier index is 2 and a fourth subcarrier of which a subcarrier index is 3.

A second differential SNR for the third subcarrier may be an SNR difference between the first subcarrier and the third subcarrier. The second differential SNR may be acquired based on the equation above when k=2. The equation above may be Equation 3 or 4. Specifically, the second differential SNR may be set to an SNR difference value between the first SNR and the second SNR for the third subcarrier. However, the SNR difference value may be limited in the range of the minimum value (−8 dB) to the maximum value (7 dB).

A third differential SNR for the fourth subcarrier may be an SNR difference between the second subcarrier and the third subcarrier. The third differential SNR may be acquired based on the equation above when k=3. The equation above may be Equation 3 or 4. Specifically, the third differential SNR may be set to an SNR difference value between the second SNR and the third SNR for the fourth subcarrier. However, the SNR difference value may be limited in the range of the minimum value (−8 dB) to the maximum value (7 dB).

The fourth subcarrier may be a feedback subcarrier spaced apart from the third subcarrier by the grouping value.

That is, in the feedback subcarrier having a spacing of the grouping value, an SNR may be measured for each subcarrier. The SNR value may be directly fed back for the first subcarrier transmitted first among the feedback subcarriers, and an SNR difference between adjacent subcarriers may be fed back starting from the second subcarrier.

The predetermined frequency band may be set for a single channel, two bonded channels, three bonded channels, or four bonded channels, The grouping value may be set to one of values 2, 4, 8, and 16.

According to an embodiment proposed in the present specification, since a differential SNR which is an SNR difference between adjacent subcarriers is fed back in a MU exclusive beamforming report field configured for MU-MIMO, the number of bits required for a feedback can be decreased, and channel state information can be effectively fed back in a beamforming process.

BRIEF DESCRIPTION OF THE DRAWINGS

FIG. 9 is a diagram showing a PPDU structure that can be applied to the present invention.

FIG. 16 shows a digital Fbck control field according to an embodiment of the present specification.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

Although diverse mobile communication systems applying the present invention may exist, a wireless LAN (WLAN) system will hereinafter be described in detail as an example of such mobile communication system.

1. Wireless LAN (WLAN) System

1-1. General Wireless LAN (WLAN) System

Figure 1:
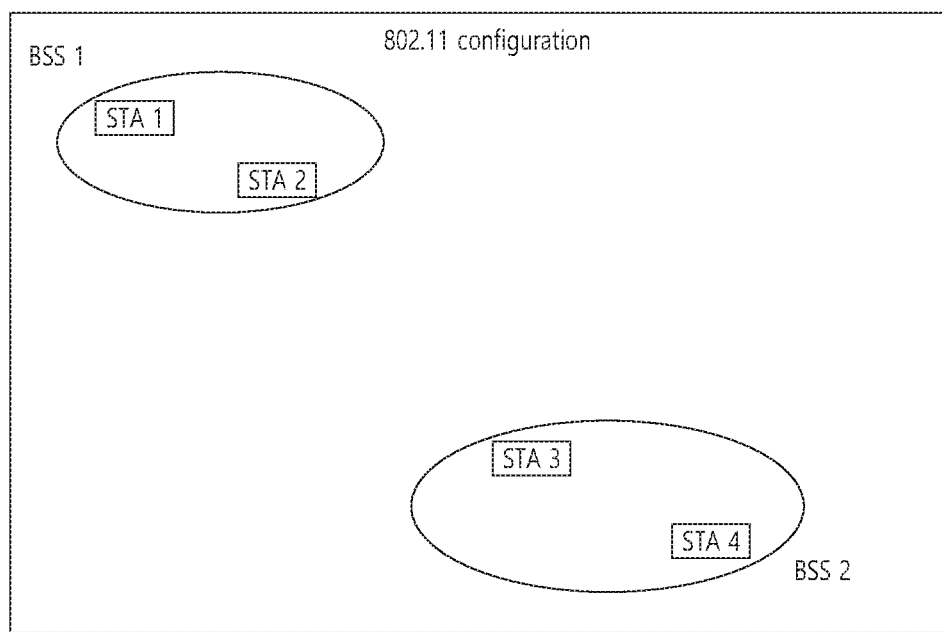
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
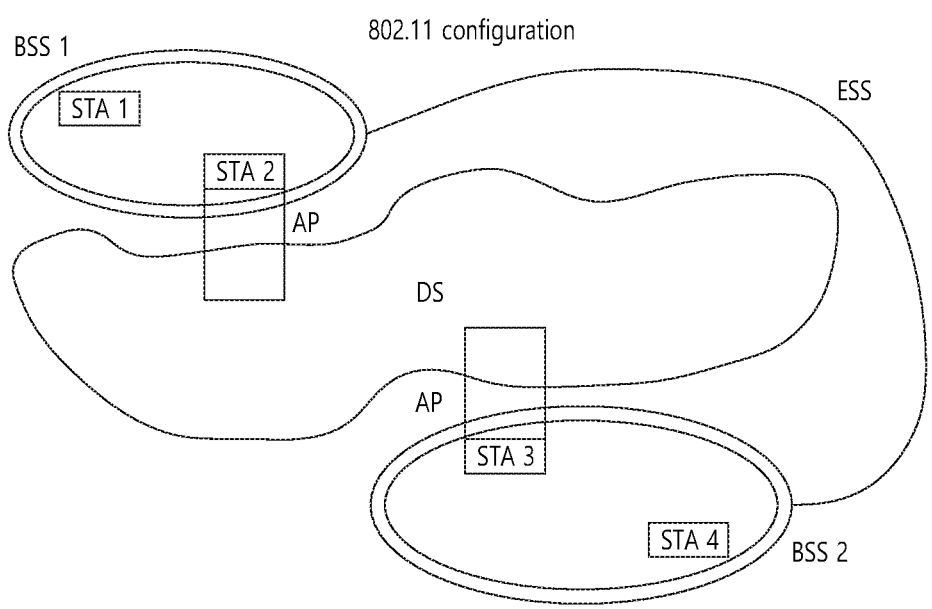
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2. Channel Bonding in a Wireless LAN (WLAN) System

Figure 3:
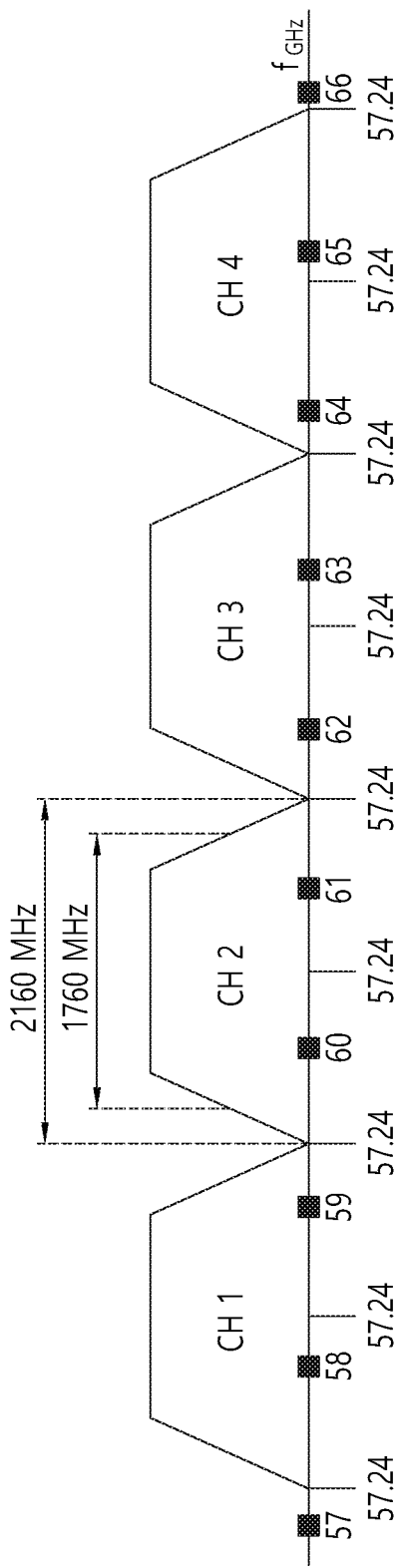
FIG. 3 is a diagram describing a channel in a 60 GHz band for describing a channel bonding operation according to an exemplary embodiment of the present invention.

FIG. 3 is a diagram describing a channel in a 60 GHz band for describing a channel bonding operation according to an exemplary embodiment of the present invention.

As shown in FIG. 3, 4 channels may be configured in a 60 GHz band, and a general channel bandwidth may be equal to 2.16 GHz. An ISM band (57 GHz~66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present invention will not be limited to only one or more specific channels.

Figure 4:
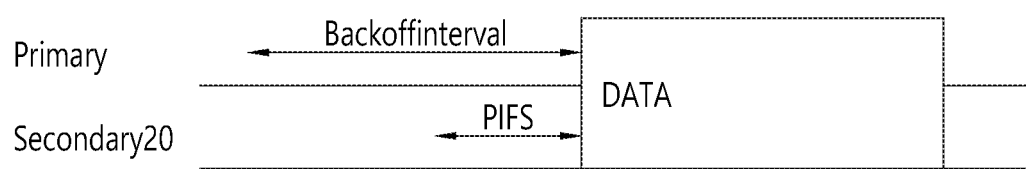
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present invention, a solution (or method) for performing scheduling-based access by having the AP transmit scheduling information to the STAs is proposed. Meanwhile, in another aspect of the present invention, a solution (or method) for performing contention-based channel access based on the above-described scheduling or independently from the above-described scheduling is proposed. Furthermore, in yet another aspect of the present invention, a method for performing communication through a spatial sharing technique based on beamforming is proposed.

1-3. Beacon Interval Configuration

Figure 5:
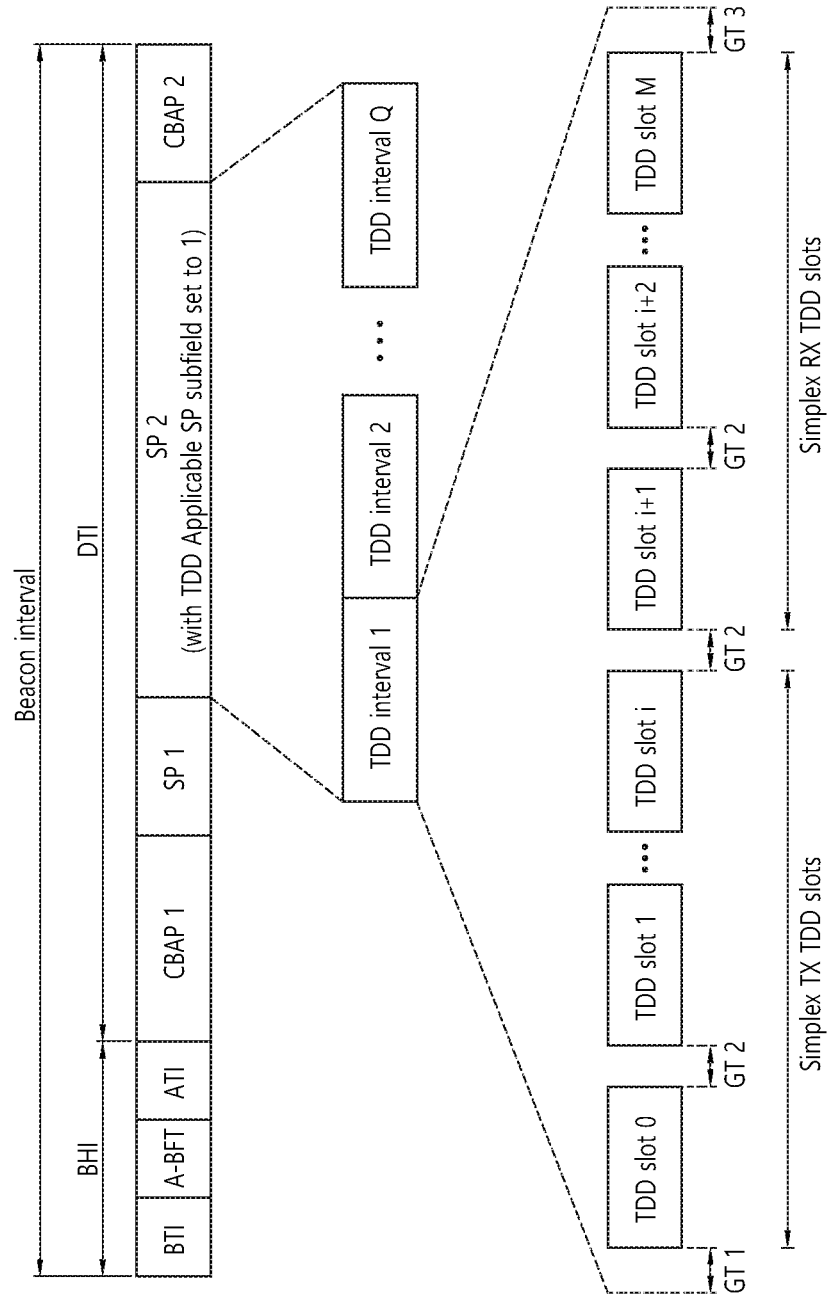
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present invention is not necessarily required to be limited only to this.

FIG. 5 shows a structure of a TDD service period (SP). The TDD SP consists of one or more consecutive and adjacent TDD intervals (TDD interval 1, TDD interval 2, . . . , TDD interval Q) actualized by a TDD slot structure element. The TDD interval includes one or more TDD slots. Adjacent TDD slots shown in FIG. 5 shall be separated temporally by a guard time (GT) defined by the TDD slot structure element (according to FIG. 5, the slots are separated temporally by GT1, GT2, GT3). If all STA operations are identical, transmission and reception of the adjacent TDD slots allocated to the same STA pair may be continued between the adjacent TDD slots.

An STA which intends to transmit data through a beamforming operation is referred to as an initiator, and an STA which receives data transmitted from the initiator is referred to as a responder. According to FIG. 5, the initiator may transmit data (or a frame) to the responder in a TX TDD slot (TDD slot 0, TDD slot 1, . . . , TDD slot i), and the responder may receive data (or a frame) from the initiator in an RX TDD slot (TDD slot i+1, TDD slot i+2, TDD slot M).

Hereinafter, a physical layer configuration in a wireless LAN (WLAN) system, in which the present invention is to be applied, will be described in detail.

1-4. Physical Layer Configuration

It will be assumed that the wireless LAN (WLAN) system according to an exemplary embodiment of the present invention may provide 3 different modulations mode as shown below.

TABLE 1

| PHY | MCS | Note |
| --- | --- | --- |
| Control PHY | 0 | |
| Single carrier PHY (SC PHY) | 1 . . . 12<br>25 . . . 31 | (low power SC PHY) |
| OFDM PHY | 13 . . . 24 | |

Figure 6:
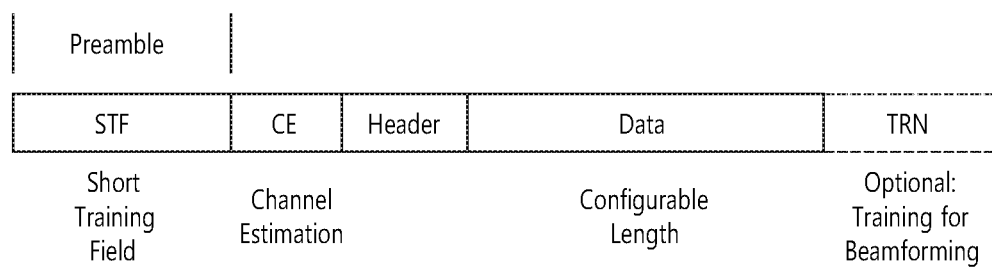
FIG. 6 is a diagram describing a physical configuration of a legacy radio frame.

Such modulation modes may be used for satisfying different requirements (e.g., high throughput or stability). Depending upon the system, among the modulation modes presented above, only some of the modulation modes may be supported. FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
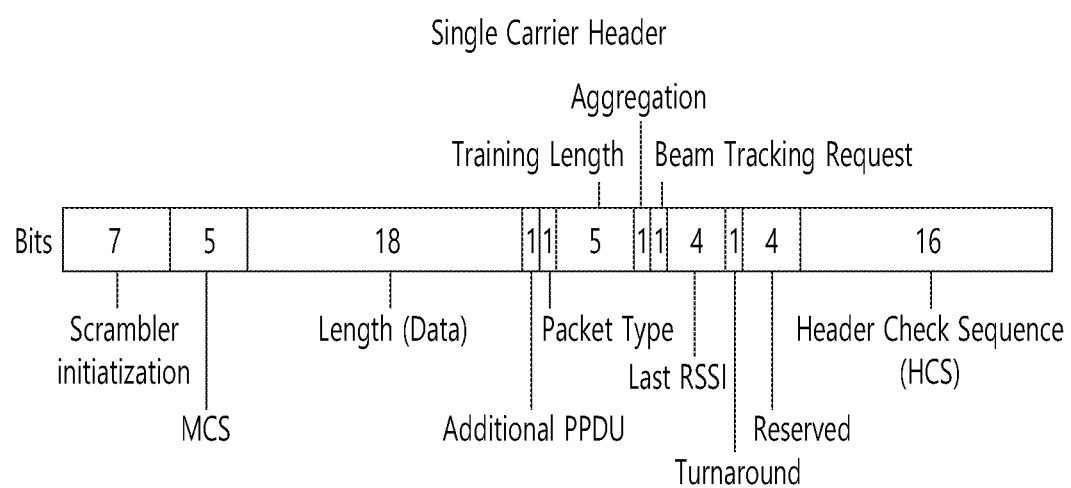
FIG. 7 and FIG. 8 are diagrams describing a configuration of a header field of the radio frame shown in FIG. 6.
Figure 8:
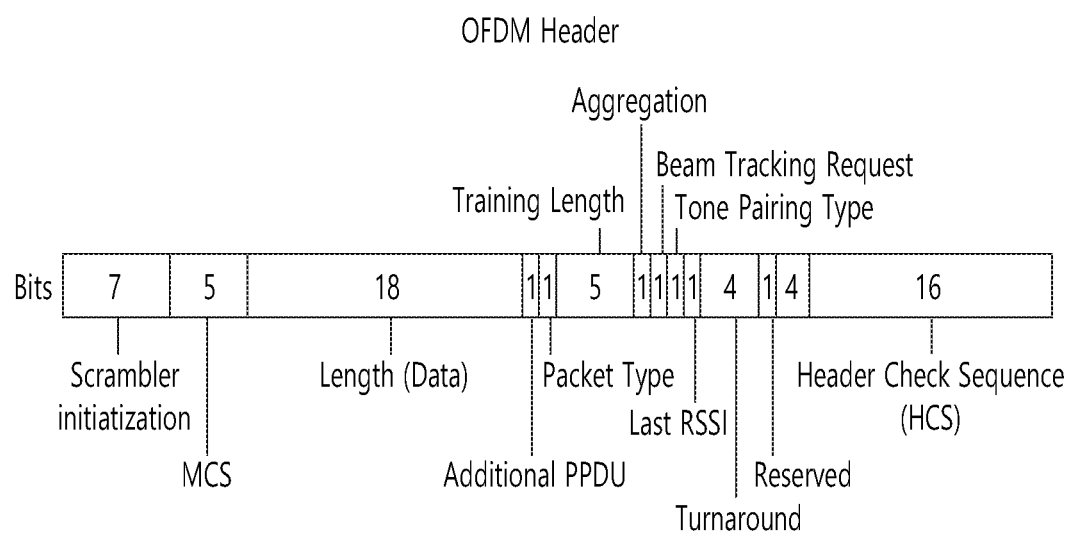

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present invention. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel. And, according to the exemplary embodiment of the present invention, it may be considered to perform the transmission (gap filling) of a new STF and CE field along with the legacy preamble at the same time through the 400 MHz band between each channel.

In this case, as shown in FIG. 9, the PPDU structure according to the present invention has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
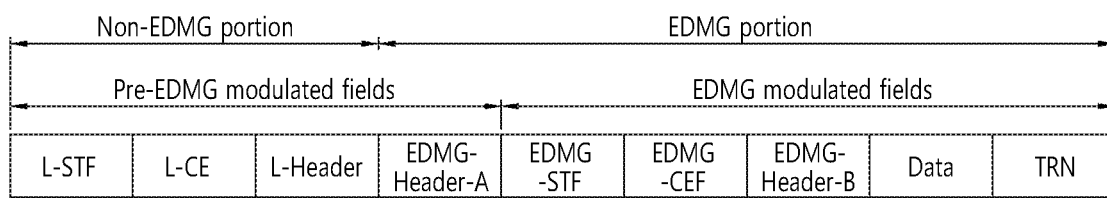
FIG. 10 is a diagram showing a simple PPDU structure that can be applied to the present invention.

FIG. 10 is a diagram showing a simple PPDU structure that can be applied to the present invention. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

The (legacy) preamble may be the part of the PPDU that is used for packet detection, automatic gain control (AGC), frequency offset estimation, synchronization, indication of modulation (SC or OFDM) and channel estimation. The format of the preamble may be common to both OFDM packets and SC packets. In this case, the preamble may be composed of a short training field (STF) and a channel estimation (CE) located after the STF.

2. Beamforming Procedure that is Applicable to the Present Invention

As described above, methods such as channel bonding, channel aggregation, FDMA, and so on, which transmit data by using multiple channels at the same time may be applied in the 11ay system that can apply the present invention. Most particularly, since the 11ay system that can apply the present invention uses signals of a high frequency band, beamforming operation may be applied in order to transmit and/or receive signals at a high reliability level.

However, in the related art 11 ad system, a beamforming method for one channel is only disclosed, and there is no implication on any beamforming method that can be applied for multiple channels. Accordingly, the present invention proposes a beamforming procedure that is applicable to a data transmission method being performing through multiple channels (e.g., channel bonding, channel aggregation, FDMA, and so on) according to the 11ay system.

More specifically, hereinafter a method of performing beamforming for only one channel (Section 3.1.) and a method of performing beamforming for multiple continuous or non-continuous channels (Section 3.2.), which are performed by the STA before the data transmission process in order to perform the data transmission through beamforming, will each be described in detail.

2.1. Performing Beamforming for Only One Channel

Figure 11:
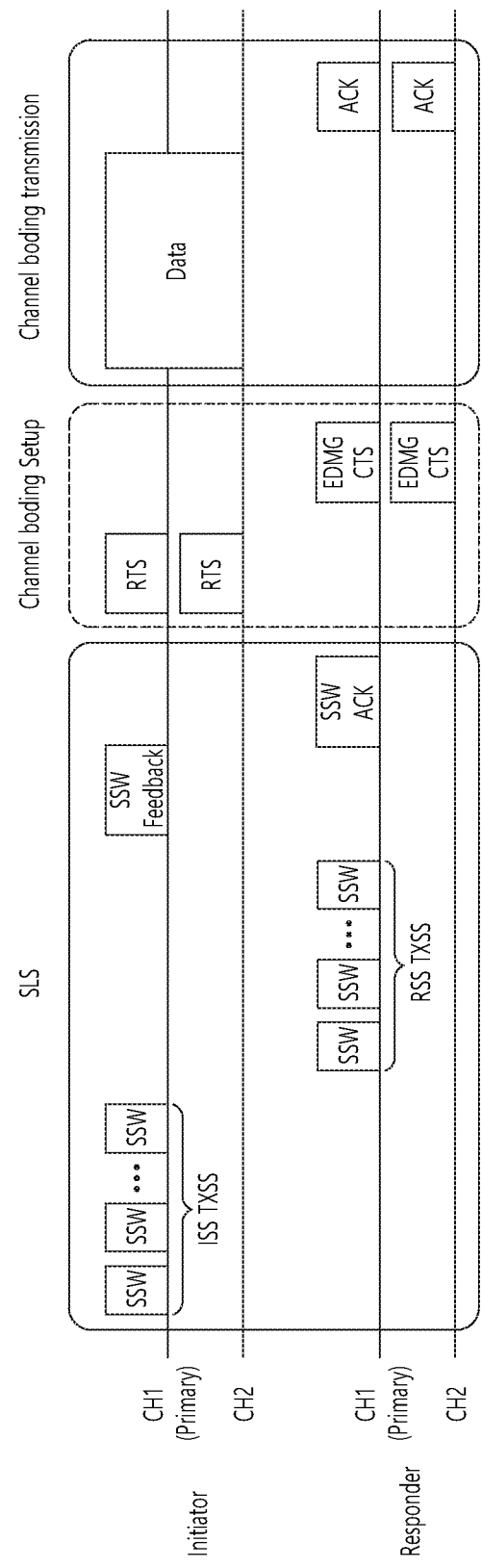
FIG. 11 is a diagram showing an operation for performing beamforming on one channel according to an exemplary embodiment of the present invention.

FIG. 11 is a diagram showing an operation for performing beamforming on one channel according to an exemplary embodiment of the present invention. Referring to FIG. 11, an STA that intends to transmit data through the beamforming operation is referred to as an initiator, and an STA that receives the data from the initiator is referred to as a responder. Also, although only a total of 2 channels (e.g., CH1, CH2) are shown in FIG. 11, the configuration of the present invention may also be extendedly applied to channel bonding, channel aggregation, and so on, through 3 or more channels.

As shown in FIG. 11, the beamforming procedure according to an exemplary embodiment of the present invention may be configured of a sector level sweep (SLS) phase, a channel bonding setup phase, and a channel bonding transmission phase. Hereinafter, the characteristics of each phase will be described in detail.

2.1.1. SLS Phase

In a 60 GHz band supporting the 11ay system, which can apply the present invention, in order to deliver data, control information, and so on, at a high reliability level, a directional transmission method, and not an omni transmission method, may be applied.

As a process for performing such application, the STAs that intend to transmit and/or receive data may be capable of knowing a Tx or Rx best sector for the initiator and the responder through the SLS process.

For a more detailed description of the above, configurations that are applicable to the SLS phase will hereinafter be described in detail with reference to the accompanying drawing(s).

Figure 12:
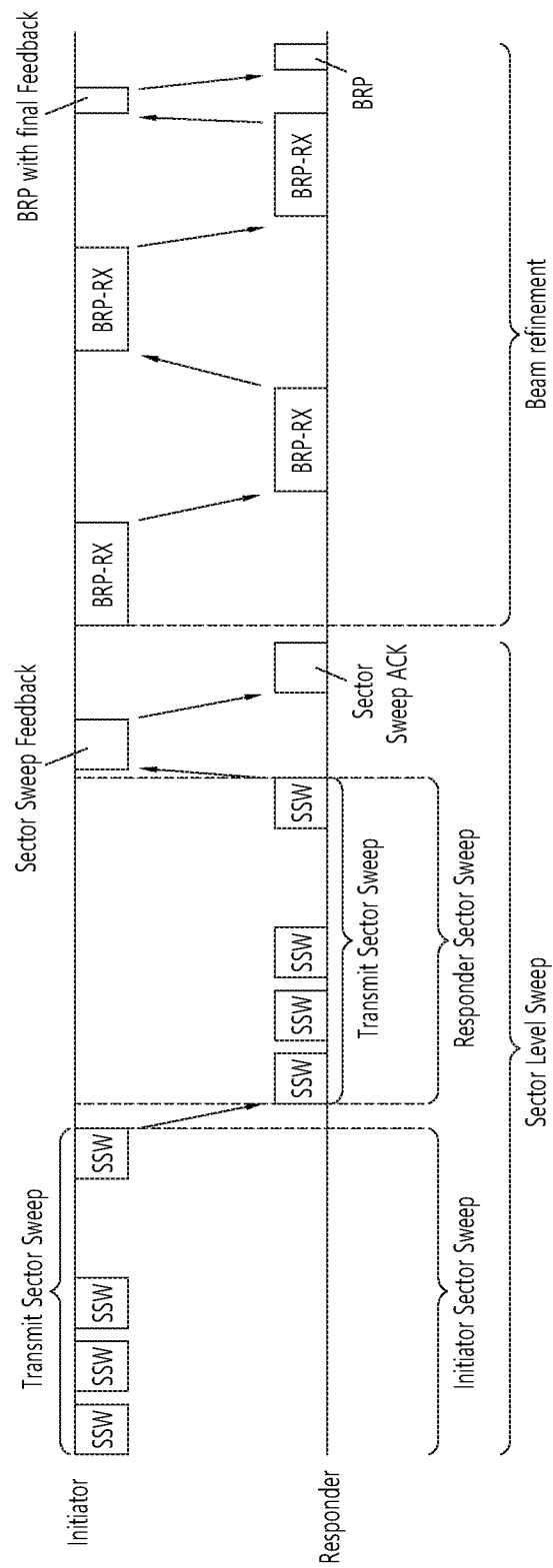
FIG. 12 shows an example of a beamforming training procedure that can be applied to the present invention.

FIG. 12 shows an example of a beamforming training procedure that can be applied to the present invention.

In a BF training that is generated during an Association BeamForming Training (A-BFT) allocation, the AP or PCP/AP becomes the initiator, and the non-AP and non-PCP/AP STA becomes the responder. In a BF training that is generated during an SP allocation, a source (EDMG) STA of the SP becomes the initiator, and a destination STA of the SP becomes the responder. In a BF training that is generated during a Transmission Opportunity (TXOP) allocation, a TXOP holder becomes the initiator, and a TXOP responder becomes the responder.

A link from the initiator to the responder is referred to as an initiator link, and a link from the responder to the initiator is referred to as a responder link.

The BF training is initiated along with the Sector Level Sweep (SLS) from the initiator. An object of the SLS phase is to allow communication to be established between two STAs in a control PHY layer or a higher MCS. Most particularly, the SLS phase provides only the transmission of the BF training.

Additionally, if a request is made by the initiator or the responder, a Beam Refinement Protocol or Beam Refinement Phase (BRP) may follow the SLS phase.

An object of the BRP phase is to enable iterative refinement of an Antenna Weight Vector (AWV) of all transmitter and receivers in all STAs. Among the STAs participating in the beam training, if one STA chooses to use only one transmission antenna pattern, reception training may be performed as part of the SLS phase.

As a more detailed description of the SLS phase, the SLS phase may include four elements listed below: an Initiator Sector Sweep (ISS) for training an initiator link, a Responder Sector Sweep (RSS) for training a responder link, a SSW feedback, and a SSW ACK.

The initiator initiates the SLS phase by transmitting the frame(s) of the ISS.

The responder does not initiate the transmission of the frame(s) of the RSS before the ISS is successfully completed. However, a case where the ISS is generated during the BTI may be an exemption.

The initiator does not initiate the SSW feedback before the RSS phase is successfully completed. However, a case where the RSS is generated within the A-BFT may be an exemption. The responder does not initiate the SSW ACK of the initiator during the A-BFT.

The responder initiates the SSW ACK of the initiator immediately after successfully completing the SSW feedback of the initiator.

During the SLS phase, the BF frame that is transmitted by the initiator may include a (EDMG) beacon frame, a SSW frame, and a SSW feedback frame. During the SLS phase, the BF frame that is transmitted by the responder may include a SSW frame and a SSW-ACK frame.

During the SLS, if each of the initiator and the responder executes the Transmit Sector Sweep (TXSS), at the end of the SLS phase, each of the initiator and the responder possesses its own transmit sector. If the ISS or RSS employs (or uses) a receive sector sweep, each of the responder or initiator possesses its own receive sector.

The STA does not change (or vary) the transmit power (or transport power) during the sector sweep.

Figure 13:
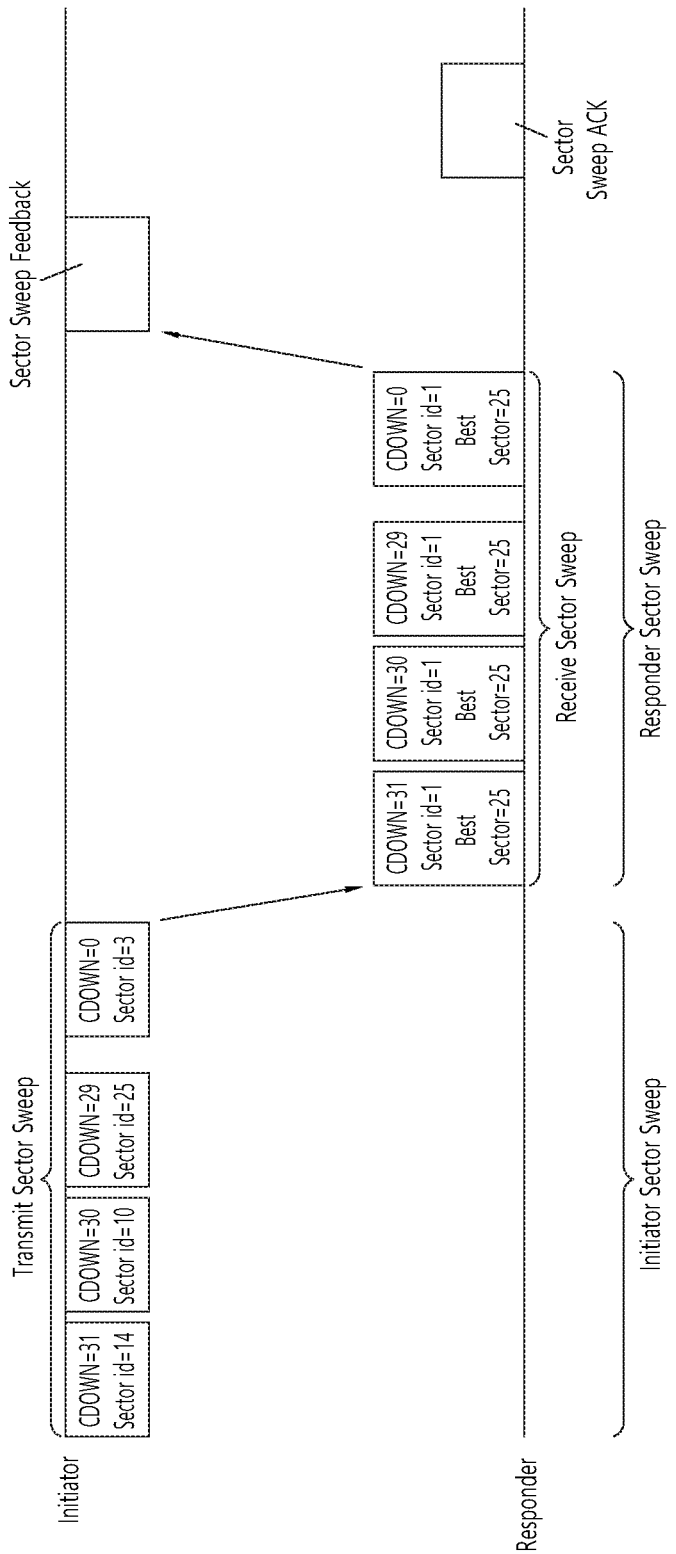
FIG. 13 and FIG. 14 is a diagram showing examples of a Sector Level Sweep (SLS) phase.
Figure 14:
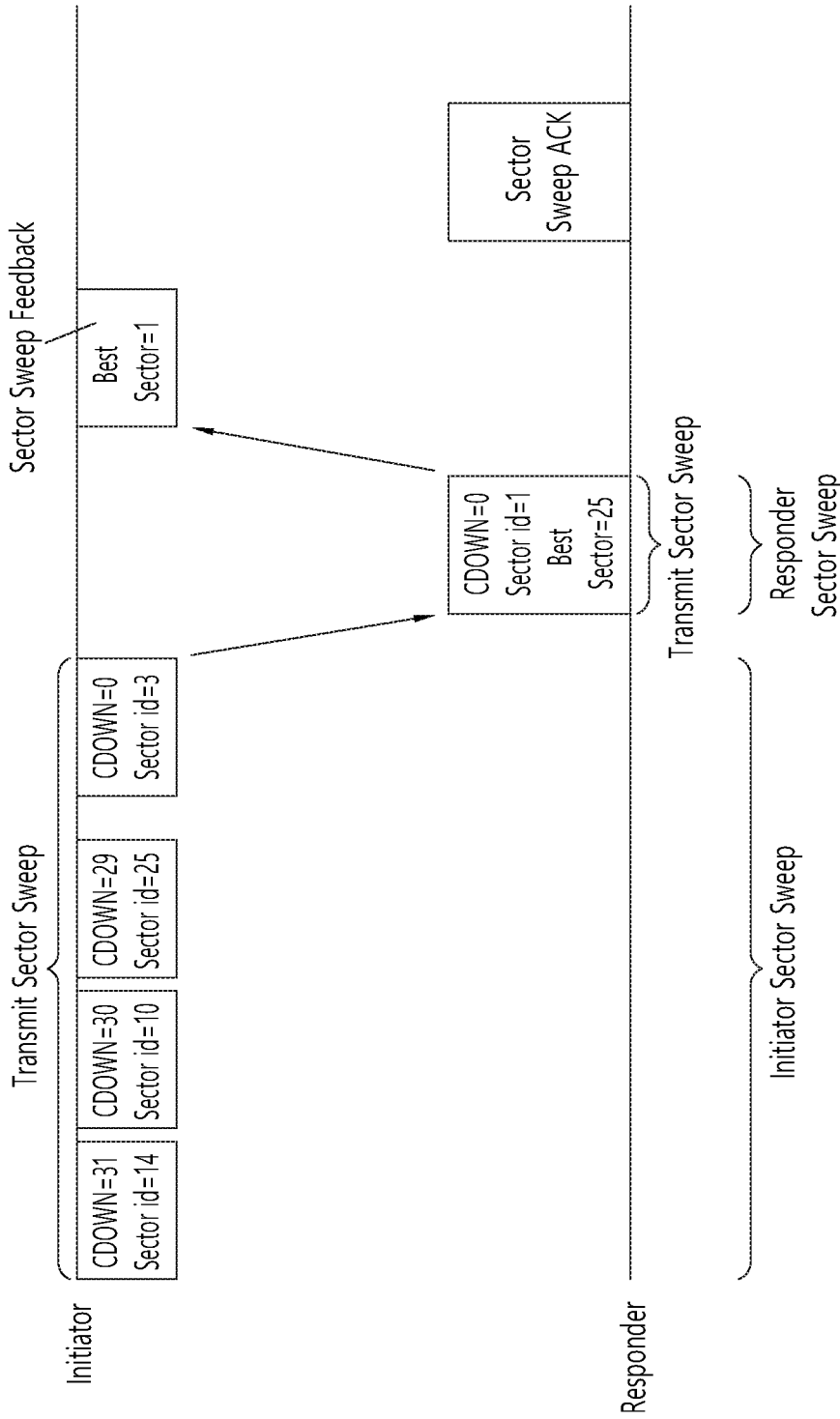

FIG. 13 and FIG. 14 is a diagram showing examples of a SLS phase.

In FIG. 13, the initiator has numerous sectors, and the responder has one transmit sector and one receive sector, which are used in the RSS. Accordingly, the responder transmits all of the responder SSW frames through the same transmit sector, and, at the same time, the initiator switches the receive antenna.

In FIG. 14, the initiator has numerous transmit sectors, and the responder has one transmit sector. In this case, the receive training for the initiator may be performed during the BRP phase.

Such SLS may be described as presented below.

As a protocol performing link detection in an 802.11ay system that can apply the present invention, the SLS corresponds to a beam training method, wherein network nodes consecutively transmits and/or receives frames including the same information by switching only the direction of the beam, and selecting, among the successfully received frames, a beam direction having the best index (e.g., Signal to Ratio (SNR), Received Signal Strength Indicator (RSSI), and so on) indicating the capability of the receive channel link.

Hereinafter, the BRP may be described as presented below.

As a protocol finely adjusting a beam direction that can maximize the data throughput from a beam direction, which is determined by the SLS or another means, the BRP may be performed when needed. Such BRP performs beam training by using a BRP frame, which is defined for the BRP protocol and which includes beam training information and information reporting the training results. For example, the BRP corresponds to a beam training method, wherein a BRP frame is transmitted and/or received by using a beam that is determined by a previous beam training, and wherein a beam training is actually performed by using a beam training sequence, which is included in an end part of the successfully transmitted and/or received BRP frame. The BRP is different from the SLS in that the SLS uses the frame itself for the beam training, whereas the BRP uses only a beam training sequence.

Such SLS phase may be performed during a Beacon Header Interval (BHI) and/or a Data Transfer Interval (DTI).

Firstly, the SLS phase being performed during the BHI may be the same as the SLS phase, which is defined in the 11ad system for its co-existence with the 11ad system.

Subsequently, the SLS phase, which is performed while the DTI is being performed, may be performed in case a beamforming training is not performed between the initiator and the responder, or in case a beamforming (BF) link is lost. At this point, if the initiator and the responder correspond to the 11ay STA, the initiator and the responder may transmit a short SSW frame instead of the SSW frame for the SLS phase.

Herein, the short SSW frame may be defined as a frame including a short SSW packet within a data field of a DMG control PHY or DMG control mode PPDU. At this point, a detailed format of the short SSW packet may be differently configured in accordance with the purpose (e.g., I-TXSS, R-TXSS, and so on) for which the short SSW packet is being transmitted.

The characteristics of the above-described SLS phase may also be applied to all of the SLS phases that will hereinafter be described.

2.1.2. Channel Bonding Setup Phase

Referring to FIG. 11, the STAs (e.g., initiator, responder, and so on) that intend to perform data communication in the above-described phase may transmit and/or receiving control information for channel bonding, channel aggregation, FDMA transmission, and so on, while sending and receiving an RTS (setup frame) and a DMG CTS (feedback frame) to and from one another. At this point, information for the transmission method using multiple channels, such as channel bonding, channel aggregation, FDMA transmission, and so on, wherein the information includes channel information, channel bandwidth, and so on, may be applied as the information being transmitted and received to and from one another.

In this exemplary embodiment, beamforming training for one channel (e.g., primary channel) has already been performed through the above-described SLS phase, and, accordingly, the initiator and the responder may assume that it is possible to equally apply the beamforming result (e.g., direction of the best sector) for the one channel to other channels as well. Accordingly, when the initiator and responder transmit the RTS and DMG CTS through multiple channels, the RTS and DMG CTS may be transmitted by applying the best sector direction, which is decided earlier through the SLS phase, as described above, to all of the channels.

2.1.3. Channel Bonding Transmission Phase

As shown in FIG. 11, after receiving the DMG CTS, which corresponds to the response to the transmitted RTS, the initiator may transmit actual data through multiple idle channels by using information formation on the channel that is negotiated with the responder, and other information, such as channel bandwidth, and so on.

More specifically, the initiator may transmit and/or receive the RTS and DMG CTS through the above-described channel bonding setup phase and may transmit and/or receive information on the actual channel to which the channel bonding (or channel aggregation) method is to be applied.

For example, although it is not shown in FIG. 11, even though the initiator has transmitted the RTS through a total of 4 channels, the initiator may receive DMG CTS for only 2 channels from the responder. This is because the responder has determined that the remaining 2 channels are currently in a busy state or in a state of being not available for usage.

By using the above-described method, the initiator and the responder may acquire information on the channel that can actually be used for the data transmitted, and the initiator may transmit data through channels that can actually be used.

At this point, since the initiator and the responder have already performed the beamforming training for only one channel (e.g., primary channel), the initiator and the responder may transmit and/or receive data signals by applying the beamforming training result (e.g., best sector direction), which was acquired from the one channel, to all channels.

Although FIG. 11 only shows the operation performed by the initiator for transmitting data by using channel bonding, the initiator may also transmit data by using the channel aggregation method.

In response to this, the responder may transmit an ACK frame through the same channel that was used by the initiator for transmitting the data. At this point, the ACK frame may be duplicated and transmitted through each channel, which was used for transmitting the data, or the ACK frame may be transmitted after performing channel bonding.

3. VHT Compressed Beamforming Report Field

Herein, a very high throughput (VHT) compressed beamforming report field proposed in 802.11ac will be described.

The VHT compressed beamforming report field is used to transfer explicit feedback information in a form of an angle which indicates a compressed signal by a VHT compressed beamforming feedback. The angle indicates a compressed beamforming feedback matrix V used by a transmission beamformer to determine a steering matrix Q.

The VHT compressed beamforming report information includes a channel matrix element which is indexed by a matrix angle in the order shown in Table 4 described below, and is indexed by a data subcarrier index, from a second lowest frequency to a highest frequency.

The VHT compressed beamforming report information has the structure and order defined in the following table. Herein, Na is the number of angles used in a compressed beamforming feedback matrix subfield (see the table below).

TABLE 2

| Field | Size (bits) | Meaning |
|---|---|---|
| Average SNR of Space-Time Stream 1 | 8 | Signal-to-noise ratio at the beamformee for space-time stream 1 averaged over all data subcarriers, See Table 9-71. |
| . . . | . . . | . . . |
| Average SNR of Space-Time Stream Nc | 8 | Signal-to-noise ratio at the beamformee for space-time stream Nc averaged over all data subcarriers, See Table 9-71. |
| Compressed Beamforming Feedback Matrix V for subcarrier k = scidx(0) | Na × $(b_\psi + b_\phi)/2$ | Compressed beamforming feedback matrix as defined in Table 9-67 |
| Compressed Beamforming Feedback Matrix V for subcarrier k = scidx(1) | Na × $(b_\psi + b_\phi)/2$ | Compressed beamforming feedback matrix as defined in Table 9-67 |
| Compressed Beamforming Feedback Matrix V for subcarrier k = scidx(2) | Na × $(b_\psi + b_\phi)/2$ | Compressed beamforming feedback matrix as defined in Table 9-67 |
| . . . | . . . | . . . |
| Compressed Beamforming Feedback Matrix V for subcarrier k = scidx(Ns − 1) | Na × $(b_\psi + b_\phi)/2$ | Compressed beamforming feedback matrix as defined in Table 9-67 |

NOTE-
scidx( ) is defined in table 9-70.

Ns is the number of subcarriers in which the compressed beamforming matrix subfield is transmitted back to a beamformer. The beamformer may decrease Ns by using a method called grouping in which only one compressed beamforming feedback matrix is reported for each group of Ng adjacent subcarriers. Ns is a channel bandwidth of a VHT MIMO control field and a function of a grouping subfield. The order by which Ns, an accurate subcarrier index, and a compressed beamforming feedback matrix subfield are transmitted is listed in 802.11-2016. Even in case of corresponding to different subcarriers, there is no padding between angles of the VHT compressed beamforming report information. If a size of the VHT compressed beamforming report information is not an integer multiple of 8 bits, up to seven zeros may be added to the end of the field to make it the integer multiple of 8 bits.

In Table 2 above, an average SNR of a space-time stream i is an 8-bit 2's complement integer.

TABLE 3

| Average SNR of Space-Time Stream i subfield | AvgSNR$_i$ |
|---|---|
| −128 | ≤−10 dB |
| −127 | −9.75 dB |
| −126 | −9.5 dB |
| ... | ... |
| +126 | 53.5 dB |
| +127 | ≥53.75 dB |

In Table 3 above, AvgSNR$_i$ is obtained by calculating a per-subcarrier SNR in unit of decibel (dB) for a subcarrier in which a compressed beamforming feedback matrix subfield is to be transmitted again and then by calculating an arithmetic average of a corresponding value (before being averaged). Each SNR value per tone of a stream i corresponds to an SNR associated with a column i of a beamformer feedback matrix V determined in a beamformer. Each SNR corresponds to a predicted SNR in the beamformer when the beamformer applies all columns of the matrix V.

According to Table 3 above, an average SNR of a timespace stream i is included in a dB range of which a minimum value is −10 dB and a maximum value is 53.75 dB, and an SNR value included in a corresponding range has a step of 0.25 dB. The total number of the average SNR values of the space-time stream i is 256, and may be expressed by 8 bits (2^8). However, since the average SNR space-time stream i is expressed by 8 bits for each tone, there is a disadvantage in that many bits are used.

Next, a MU exclusive beamforming report field will be described.

The MU exclusive beamforming report field is used by the VHT compressed beamforming feedback to carry explicit feedback information in the form of delta SNR. The information in the VHT compressed beamforming report field and the MU exclusive beamforming report field may be used by a transmission MU beamformer to determine a steering matrix Q.

The MU exclusive beamforming report information consists of delta SNR subfields for respective space-time streams 1 to Nc of a subset of the subcarriers typically spaced apart by 2Ng. Herein, Ng is signaled in the grouping subfield of the VHT MIMO control field, starting from the lowest frequency subcarrier and continuing to the highest frequency subcarrier. No padding is present between $\Delta SNR_{k,i}$ in the MU exclusive beamforming report field, even in case of corresponding to different subcarriers. The subset of subcarriers included is determined by the values of the channel width and grouping subfields of the VHT MIMO control field as listed in Table 5 to be described below.

For each subcarrier included, the dB deviation of the SNR of that subcarrier for each column of V relative to the average SNR of the corresponding space-time stream is computed using the equation below

[Equation 1]

$$\Delta SNR_{k,i} = \min\left(\max\left(\text{round}\left(10\log_{10}\left(\frac{\|H_k V_{k,i}\|^2}{N}\right) - \overline{SNR_i}\right), -8\right), 7\right) \quad (9\text{-}2)$$

where
k is the subcarrier index in the range sscidx(0), . . . , sscidx(Ns'−1)
i is the space-time stream index in the range 1, . . . , Nc
$H_k$ is the estimated MIMO channel for subcarrier
$V_{k,i}$ is column i of the beamforming matrix V for subcarrier k
N is the average noise plus interference power, measured at the beamformee, that was used to calculate $\overline{SNR_i}$
$\overline{SNR_i}$ is the average SNR of space-time stream i reported in the VHT Compressed Beamforming Report information (Average SNR in Space-Time Stream i field)

Each delta SNR subfield includes the $\Delta SNR_{k,i}$ computed using Equation 1 above and quantized with 4 bits in the range of −8 dB to 7 dB in unit of 1 dB. The structure of the MU exclusive beamforming report field is defined as shown in the following table.

TABLE 4

| Field | Size (Bits) | Meaning |
|---|---|---|
| Delta SNR for space-time stream 1 for subcarrier k = sscidx(0) | 4 | $\Delta SNR_{sscidx(0),\ 1}$ as defined in Equation (9-2) |
| ... | ... | ... |
| Delta SNR for space-time stream Nc for subcarrier k = sscidx(0) | 4 | $\Delta SNR_{sscidx(0),\ Nc}$ as defined in Equation (9-2) |
| Delta SNR for space-time stream 1 for subcarrier k = sscidx(1) | 4 | $\Delta SNR_{sscidx(1),\ 1}$ as defined in Equation (9-2) |
| ... | ... | ... |
| Delta SNR for space-time stream Nc for subcarrier k = sscidx(1) | 4 | $\Delta SNR_{sscidx(1),\ Nc}$ as defined in Equation (9-2) |
| ... | ... | ... |
| Delta SNR for space-time stream 1 for subcarrier k = sscidx(Ns' − 1) | 4 | $\Delta SNR_{sscidx(Ns'-1),\ 1}$ as defined in Equation (9-2) |
| ... | ... | ... |
| Delta SNR for space-time stream Nc for subcarrier k sscidx(Ns' − 1) | 4 | $\Delta SNR_{sscidx(Ns'-1),\ Nc}$ as defined in Equation (9-2) |

NOTE-
sscidx( ) is defined in Table 9-73.

In Table 4 above, Ns' is the number of subcarriers for which the delta SNR subfield is sent back to the beamformer. The following table shows Ns', the exact subcarrier indices and their order for which the delta SNR is sent back.

TABLE 5

| Channel Width | Ng | Ns' | Subcarriers for which the Delta SNR subfield is sent: sscidx(0), sscidx(1), . . . sscidx(Ns' − 1) |
|---|---|---|---|
| 20 MHz | 1 | 30 | −28, −26, −24, −22, −20, −18, −16, −14, −12, −10, −8, −6, −4, −2, −1, 1, 2, 4, 6, 8, 10, 12, 14, 16, 18, 20, 22, 24, 26, 28 |
| | 2 | 16 | −28, −24, −20, −16, −12, −8, −4, −1, 1, 4, 8, 12, 16, 20, 24, 28 |
| | 4 | 10 | −28, −20, −12, −4, −1, 1, 4, 12, 20, 28 |
| 40 MHz | 1 | 58 | −58, −56, −54, −52, −50, −48, −46, −44, −42, −40, −38, −36, −34, −32, −30, −28, −26, −24, −22, −20, −18, −16, −14, −12, −10, −8, −6, −4, −2, 2, 4, 6, 8, 10, 12, 14, 16, 18, 20, 22, 24, 26, 28, 30, 32, 34, 36, 38, 40, 42, 44, 46, 48, 50, 52, 54, 56, 58 |
| | 2 | 30 | −58, −54, −50, −46, −42, −38, −34, −30, −26, −22, −18, −14, −10, −6, −2, 2, 6, 10, 14, 18, 22, 26, 30, 34, 38, 42, 46, 50, 54, 58 |
| | 4 | 16 | −58, −50, −42, −34, −26, −18, −10, −2, 2, 10, 18, 26, 34, 42, 50, 58 |
| 80 MHz | 1 | 122 | −122, −120, −118, −116, −114, −112, −110, −108, −106, −104, −102, −100, −98, −96, −94, −92, −90, −88, −86, −84, −82, −80, −78, −76, −74, −72, −70, −68, −66, −64, −62, −60, −58, −56, −54, −52, −50, −48, −46, −44, −42, −40, −38, −36, −34, −32, −30, −28, −26, −24, −22, −20, −18, −16, −14, −12, −10, −8, −6, −4, −2, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 118, 120, 122 |
| | 2 | 62 | −122, −118, −114, −110, −106, −102, −98, −94, −90, −86, −82, −78, −74, −70, −66, −62, −58, −54, −50, −46, −42, −38, −34, −30, −26, −22, −18, −14, −10, −6, −2, 2, 6, 10, 14, 18, 22, 26, 30, 34, 38, 42, 46, 50, 54, 58, 62, 66, 70, 74, 78, 82, 86, 90, 94, 98, 102, 106, 110, 114, 118, 122 |
| | 4 | 32 | −122, −114, −106, −98, −90, −82, −74, −66, −58, −50, −42, −34, −26, −18, −10, −2, 2, 10, 18, 26, 34, 42, 50, 58, 66, 74, 82, 90, 98, 106, 114, 122 |
| 160 MHz | 1 | 244 | −250, −248, −246, −244, −242, −240, −238, −236, −234, −232, −230, −228, −226, −224, −222, −220, −218, −216, −214, −212, −210, −208, −206, −204, −202, −200, −198, −196, −194, −192, −190, −188, −186, −184, −182, −180, −178, −176, −174, −172, −170, −168, −166, −164, −162, −160, −158, −156, −154, −152, −150, −148, −146, −144, −142, −140, −138, −136, −134, −132, −130, −126, −124, −122, −120, −118, −116, −114, −112, −110, −108, −106, −104, −102, −100, −98, −96, −94, −92, −90, −88, −86, −84, −82, −80, −78, −76, −74, −72, −70, −68, −66, −64, −62, −60, −58, −56, −54, −52, −50, −48, −46, −44, −42, −40, −38, −36, −34, −32, −30, −28, −26, −24, −22, −20, −18, −16, −14, −12, −10, −8, −6, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 118, 120, 122, 124, 126, 130, 132, 134, 136, 138, 140, 142, 144, 146, 148, 150, 152, 154, 156, 158, 160, 162, 164, 166, 168, 170, 172, 174, 176, 178, 180, 182, 184, 186, 188, 190, 192, 194, 196, 198, 200, 202, 204, 206, 208, 210, 212, 214, 216, 218, 220, 222, 224, 226, 228, 230, 232, 234, 236, 238, 240, 242, 244, 246, 248, 250<br>NOTE-Subcarriers 0, ±2, ±4 and ±128 are skipped. |
| 160 MHz | 2 | 124 | −250, −246, −242, −238, −234, −230, −226, −222, −218, −214, −210, −206, −202, −198, −194, −190, −186, −182, −178, −174, −170, −166, −162, −158, −154, −150, −146, −142, −138, −134, −130, −126, −122, −118, −114, −110, −106, −102, −98, −94, −90, −86, −82, −78, −74, −70, −66, −62, −58, −54, −50, −46, 42, −38, −34, −30, −26, −22, −18, −14, −10, −6, 6, 10, 14, 18, 22, 26, 30, 34, 38, 42, 46, 50, 54, 58, 62, 66, 70, 74, 78, 82, 86, 90, 94, 98, 102, 106, 110, 114, 118, 122, 126, 130, 134, 138, 142, 146, 150, 154, 158, 162, 166, 170, 174, 178, 182, 186, 190, 194, 198, 202, 206, 210, 214, 218, 222, 226, 230, 234, 238, 242, 246, 250<br>NOTE-Subcarriers ±2 are skipped. |
| | 4 | 64 | −250, −242, −234, −226, −218, −210, −202, −194, −186, −178, −170, −162, −154, −146, −138, −130, −126, −118, −110, −102, −94, −86, −78, −70, −62, −54, 46, −38, −30, −22, −14, −6, 6, 14, 22, 30, 38, 46, 54, 62, 70, 78, 86, 94, 102, 110, 118, 126, 130, 138, 146, 154, 162, 170, 178, 186, 194, 202, 210, 218, 226, 234, 242, 250 |
| 80 + 80 MHz | 1 | 244 | −122(L), −120(L), −118(L), −116(L), −114(L), −112(L), −110(L), −108(L), −106(L), −104(L), −102(L), −100(L), −98(L), −96(L), −94(L), −92(L), −90(L), −88(L), −86(L), −84(L), −82(L), −80(L), −78(L), −76(L), −74(L), −72(L), −70(L), −68(L), −66(L), −64(L), −62(L), −60(L), −58(L), −56(L), −54(L), −52(L), −50(L), −48(L), −46(L), −44(L), −42(L), −40(L), −38(L), −36(L), −34(L), −32(L), −30(L), −28(L), −26(L), −24(L), −22(L), −20(L), −18(L), −16(L), −14(L), −12(L), −10(L), −8(L), −6(L), −4(L), −2(L), 2(L), 4(L), 6(L), 8(L), 10(L), 12(L), 14(L), 16(L), 18(L), 20(L), 22(L), 24(L), 26(L), 28(L), 30(L), 32(L), 34(L), 36(L), 38(L), 40(L), 42(L), 44(L), 46(L), 48(L), 50(L), 52(L), 54(L), 56(L), 58(L), 60(L), 62(L), 64(L), 66(L), 68(L), 70(L), 72(L), 74(L), 76(L), 78(L), 80(L), 82(L), 84(L), 86(L), 88(L), 90(L), 92(L), 94(L), 96(L), 98(L), 100(L), 102(L), 104(L), 106(L), 108(L), 110(L), 112(L), 114(L), 116(L), 118(L), 120(L), 122(L), −122(H), −120(H), −118(H), −116(H), −114(H), −112(H), −110(H), −108(H), −106(H), −104(H), −102(H), −100(H), −98(H), −96(H), −94(H), −92(H), −90(H), −88(H), −86(H), −84(H), −82(H), −80(H), −78(H), −76(H), −74(H), −72(H), −70(H), −68(H), −66(H), −64(H), −62(H), −60(H), −58(H), −56(H), −54(H), −52(H), −50(H), −48(H), −46(H), −44(H), −42(H), −40(H), −38(H), −36(H), −34(H), −32(H), −30(H), −28(H), −26(H), −24(H), −22(H), −20(H), −18(H), −16(H), −14(H), −12(H), −10(H), −8(H), −6(H), −4(H), −2(H), 2(H), 4(H), 6(H), 8(H), 10(H), 12(H), |

TABLE 5-continued

| Channel Width | Ng | Ns' | Subcarriers for which the Delta SNR subfield is sent: sscidx(0), sscidx(1), ... sscidx(Ns' − 1) |
|---|---|---|---|
| | | | 14(H), 16(H), 18(H), 20(H), 22(H), 24(H), 26(H), 28(H), 30(H), 32(H), 34(H), 36(H), 38(H), 40(H), 42(H), 44(H), 46(H), 48(H), 50(H), 52(H), 54(H), 56(H), 58(H), 60(H), 62(H), 64(H), 66(H), 68(H), 70(H), 72(H), 74(H), 76(H), 78(H), 80(H), 82(H), 84(H), 86(H), 88(H), 90(H), 92(H), 94(H), 96(H), 98(H), 100(H), 102(H), 104(H), 106(H), 108(H), 110(H), 112(H), 114(H), 116(H), 118(H), 120(H), 122(H) |
| | 2 | 124 | −122(L), −118(L), −114(L), −110(L), −106(L), −102(L), −98(L), −94(L), −90(L), −86(L), −82(L), −78(L), −74(L), −70(L), −66(L), −62(L), −58(L), −54(L), −50(L), −46(L), −42(L), −38(L), −34(L), −30(L), −26(L), −22(L), −18(L), −14(L), −10(L), −6(L), −2(L), 2(L), 6(L), 10(L), 14(L), 18(L), 22(L), 26(L), 30(L), 34(L), 38(L), 42(L), 46(L), 50(L), 54(L), 58(L), 62(L), 66(L), 70(L), 74(L), 78(L), 82(L), 86(L), 90(L), 94(L), 98(L), 102(L), 106(L), 110(L), 114(L), 118(L), 122(L), −122(H), −118(H), −114(H), −110(H), −106(H), −102(H), −98(H), −94(H), −90(H), −86(H), −82(H), −78(H), −74(H), −70(H), −66(H), −62(H), −58(H), −54(H), −50(H), −46(H), −42(H), −38(H), −34(H), −30(H), −26(H), −22(H), −18(H), −14(H), −10(H), −6(H), −2(H), 2(H), 6(H), 10(H), 14(H), 18(H), 22(H), 26(H), 30(H), 34(H), 38(H), 42(H), 46(H), 50(H), 54(H), 58(H), 62(H), 66(H), 70(H), 74(H), 78(H), 82(H), 86(H), 90(H), 94(H), 98(H), 102(H), 106(H), 110(H), 114(H), 118(H), 122(H) |
| 80 + 80 MHz | 4 | 64 | −122(L), −114(L), −106(L), −98(L), −90(L), −82(L), −74(L), −66(L), −58(L), −50(L), −42(L), −34(L), −26(L), −18(L), −10(L), −2(L), 2(L), 10(L), 18(L), 26(L), 34(L), 42(L), 50(L), 58(L), 66(L), 74(L), 82(L), 90(L), 98(L), 106(L), 114(L), 122(L), −122(H), −114(H), −106(H), −98(H), −90(H), −82(H), −74(H), −66(H), −58(H), −50(H), −42(H), −34(H), −26(H), −18(H), −10(H), −2(H), 2(H), 10(H), 18(H), 26(H), 34(H), 42(H), 50(H), 58(H), 66(H), 74(H), 82(H), 90(H), 98(H), 106(H), 114(H), 122(H) |

NOTE 1-
sscidx( ) is defined in Table 9-72.

NOTE 2-
Subcarrier x(L) denotes subcarrier index x in the frequency segment lower in frequency, and subcarrier x(H) denotes subcarrier index x in the frequency segment higher in frequency.

4. Embodiment Applicable to the Present Invention

The present specification proposes an additional MU exclusive field for MU-MIMO in 802.11ay digital beamforming feedback.

Hereinafter, hybrid beamforming will be described.

An EDMG STA is capable of hybrid beamforming. Specifically, the hybrid beamforming is possible when one (or both) of a hybrid beamforming and SU-MIMO supported subfield included in an EDMG capabilities element of the STA and a hybrid beamforming and MU-MIMO supported subfield included in the EDMG capabilities element of the STA is 1.

Alternatively, when the hybrid beamforming and SU-MIMO supported subfield is 1 in the EDMG capability element of the STA, the STA capable of hybrid beamforming is capable of hybrid beamforming and SU-MIMO. The STA capable of hybrid beamforming may be capable of hybrid beamforming and MU-MIMO when the hybrid beamforming and MU-MIMO supported subfield of the hybrid beamforming and the EDMG capability element of the STA is 1.

The STA capable of hybrid beamforming supports a hybrid beamforming protocol

The hybrid beamforming represents transmission/reception of multi-spatial streams which use a combination of analog beamforming (by determining proper AWB) and digital beamforming (by determining a proper spatial mapping matrix) between an initiator capable of SU-MIMO and a responder capable of SU-MIMO or between an initiator capable of MU-MIMO and at least one responder capable of MU-MIMO. The spatial mapping matrix is determined based on a DMG antenna structure selected as a result of an SU-MIMO or MU-MIMO beamforming protocol The hybrid beamforming protocol supports digital baseband training and hybrid beamforming information feedback for next hybrid beamforming transmission.

The hybrid beamforming may be used to support transmission of a single spatial stream which uses multi-DMG antennas together with a combination of analog beamforming and digital beamforming between an initiator capable of SU-MIMO and a responder capable of SU-MIMO.

AWV of a DMG antenna may be selected by using an SU-MIMO beamforming protocol or an MU-MIMO beamforming protocol, which enables to determine an antenna structure for simultaneous transmission of a single or multi-spatial stream from the initiator to the responder(s) (the other way around is also possible in case of SU-MIMO).

In the hybrid beamforming protocol, a transmitting device acquires hybrid beamforming information based on a feedback from a receiving device, induced from a channel direction between the transmitting device and the receiving device.

Figure 15:
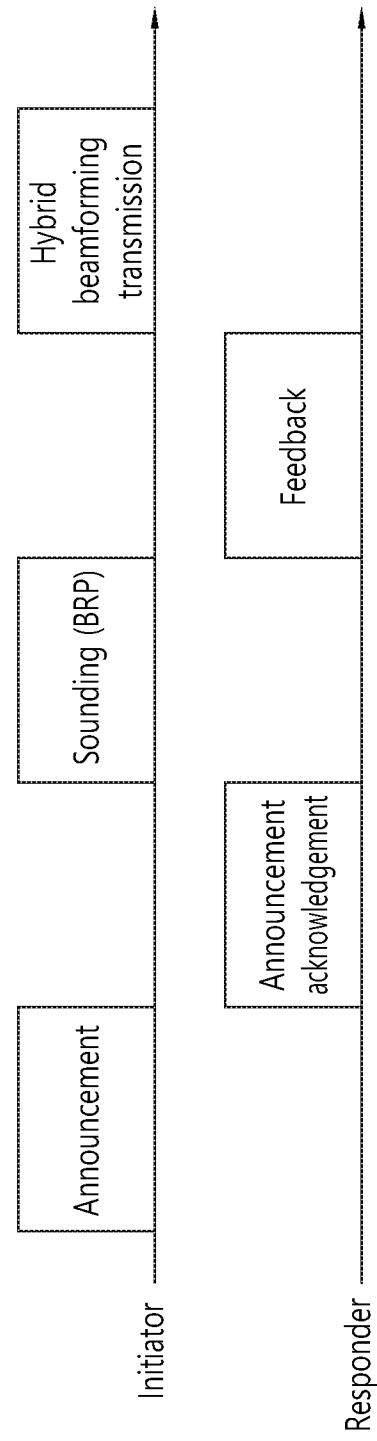
FIG. 15 shows an SU-MIMO hybrid beamforming procedure according to an embodiment of the present specification.

FIG. 15 shows an SU-MIMO hybrid beamforming procedure according to an embodiment of the present specification.

Referring to FIG. 15, hybrid beamforming includes an announcement phase, a sounding phase, and a feedback phase. The announcement phase may be skipped when a beamforming configuration is predetermined.

A MIMO feedback control element proposed in the present embodiment is used to transfer configuration information for a channel measurement feedback element, an EDMG channel measurement feedback element, and/or a digital beamforming feedback element. The MIMO feedback control element includes a digital Fbck control field.

FIG. 16 shows a digital Fbck control field according to an embodiment of the present specification.

Referring to FIG. 16, the digital Fbck control field includes subfields of Nc Index, Nr Index, Tx Antenna Maxk, Ncb, Grouping, Codebook Information, Feedback Type, Number of Feedback Matrices or Feedback Taps. Each subframe included in the digital Fbck control field is described in the following table.

TABLE 6

| Subfield | Meaning |
| --- | --- |
| Nc Index | Indicates the number of columns, Nc, in the beamforming feedback matrix minus one:<br>Set to 0 for Nc = 1<br>Set to 1 for Nc = 2<br>Set to 2 for Nc = 3<br>Set to 3 for Nc = 4<br>Set to 4 for Nc = 5<br>Set to 5 for Nc = 6<br>Set to 6 for Nc = 7<br>Set to 7 for Nc = 8 |
| Nr Index | Indicates the number of rows, Nr, in a beamforming feedback matrix minus one:<br>Set to 0 for Nr = 1<br>Set to 1 for Nr = 2<br>Set to 2 for Nr = 3<br>Set to 3 for Nr = 4<br>Set to 4 for Nr = 5<br>Set to 5 for Nr = 6<br>Set to 6 for Nr = 7<br>Set to 7 for Nr = 8 |
| Tx Antenna Mask | Indicates the Tx Antennas reported in the accompanying Digital BF Feedback element. If the CSI for the $i^{th}$ Tx Antenna is included in the accompanying Digital BF feedback element, the $i^{th}$ bit in Tx Antenna Mask is set to 1. Otherwise, the $i^{th}$ bit in Tx Antenna Mask is set to 0. |
| Ncb | Indicates the number of contiguous 2.16 GHz channels the measurement was made for minus one:<br>Set to 0 for 2.16 GHz<br>Set to 1 for 4.32 GHz<br>Set to 2 for 6.48 GHz<br>Set to 3 for 8.64 GHz |
| Grouping | Indicates the subcarrier grouping, Ng, used for beamforming feedback matrix<br>Set to 0 for $N_g$ = 2<br>Set to 1 for $N_g$ = 4<br>Sei to 2 for $N_g$ = 8<br>Set to 3 for dynamic grouping; reserved if dynamic grouping is not supported<br>If the Feedback Type subfield is 0, the Grouping subfield is reserved. |
| Codebook Information | Indicates the size of codebook entries.<br>If the SU/MU field in the MIMO Feedback Control element is 1:<br>Set to 0 for 6 bits for Ψ, 4 bits for φ<br>Value 1 is reserved<br>If the SU/MU field in the MIMO Feedback Control element is 0:<br>Set to 0 for 9 bits for Ψ, 7 bits for φ<br>Value 1 is reserved |
| Feedback Type | Indicates which type of feedback is provided. Set to 0 for uncompressed beamforming feedback in time domain (EDMG SC mode) and set to 1 for compressed using Givens-Rotation in frequency domain (EDMG OFDM mode). |
| Number of Feedback Matrices or Feedback Taps | This field is represented by the variable Nsc.<br>If the Feedback type subfield is 0, Nsc is the number of feedback taps per element of the SC feedback matrix.<br>If the Feedback Type subfield is 1 and the Grouping subfield is less than 3, Nsc is determined by Table 29.<br>If the Feedback Type subfield is 1 and the Grouping subfield is 3, Nsc specifies the number of subcarriers present in the Digital Beamforming Feedback Information field of the Digital BF Feedback element minus one. |

A digital beamforming (BF) feedback element is transmitted in a MIMO BF feedback frame, and transfers feedback information in a form of a beamforming feedback matrix and differential SNRs. The feedback information may be used by a transmission beam-former to determine a digital BF adjustment matrix Q. When the digital BF feedback element is transmitted in the MIMO BF feedback frame, an SNR field in a channel measurement feedback element is interpreted as a per-stream average SNR.

A size and configuration of the digital BF feedback element differ depending on a field value included in the MIMO feedback control element transmitted in the same frame which transmits the digital BF feedback element. Accordingly, a reference of all fields existing in the MIMO feedback control element represents an element transmitted in the same frame which transfers the digital BF feedback element.

When a feedback type subfield in the digital Fbck control field is 0, a digital BF feedback information field of the digital BF feedback element includes Nsc digital beamforming matrices. When Nsc>1, a tap delay field indicating a tap corresponding to each digital beamforming matrix is additionally present. Digital beamforming information in a time domain may be represented by a matrix function V.

The digital BF feedback element may be defined by the following table.

TABLE 7

| Field | Size | Meaning |
| --- | --- | --- |
| Element ID | 8 bits | |
| Length | 8 bits | |

TABLE 7-continued

| Field | Size | | Meaning |
|---|---|---|---|
| Element ID Extension | 8 bits | | |
| Digital Beamforming Feedback Information | Digital Beamforming Feedback Matrix 1 | $n_{bit}$ bits | If Feedback Type subfield is 0, represents the beamforming matrix in time domain for the $1^{st}$ tap as described above.<br>If Feedback Type subfield is 1, represents the beamforming matrix for the $1^{st}$ subcarrier, indexed by matrix angles in the order shown in Table 27 |
| | . . . | . . . | |
| | Digital Beamforming Feedback Matrix $N_{SC}$ | $n_{bit}$ bits | If Feedback Type subfield is 0, represents the beamforming matrix in time domain for the $N_{SC}{}^{th}$ tap as described above.<br>If Feedback Type subfield is 1, represents the beamforming matrix for $N_{SC}{}^{th}$ subcarrier, indexed by matrix angles in the order shown in Table 27 |
| Differential Subcarrier Index | Differential subcarrier index scidx(0)-scidx(1) | 3 bits | When Grouping subfield is 3, this field represents the number of subcarriers between scidx(0) and scidx(1). Otherwise, it is not present.<br>It is set to j to indicate the distance between the scidx(0) and scidx(1) is $2^j$<br>Set to 0 to indicate 1<br>Set to 1 to indicate 2<br>Set to 2 to indicate 4<br>Set to 3 to indicate 8<br>Set to 4 to indicate 16<br>Set to 5 to indicate 32<br>Values 6 and 7 are reserved. |
| | . . . | . . . | |
| | Differential subcarrier index scidx($N_{SC}$ − 1) - scidx($N_{SC}$) | 3 bits | When Grouping subfield is 3, this field represents the number of subcarriers between scidx($N_{SC}$ − 1) and scidx($N_{SC}$). Otherwise it is not present.<br>It is set to j to indicate the distance between the scidx($N_{SC}$ − 1) and scidx($N_{SC}$) is $2^j$ |
| Tap Delay | Relative Tap Delay 2 | 12 bits | When Feedback Type subfield is 0 and $N_{SC}$ > 1, this field represents the delay of tap #2 in units of $T_C/N_{CB}$ relative to Tap 1. Otherwise, it is not present. |
| | . . . | . . . | |
| | Relative Tap Delay $N_{SC}$ | 12 bits | When Feedback Type subfield is 0 and $N_{SC}$ > 1, this field represents the delay of tap #Nsc in units of $T_C/N_{CB}$ relative to Tap 1. Otherwise, it is not present. |
| MU Exclusive Beamforming Report | Differential SNR for space-time stream 1 for subcarrier k = scidx(0) | 8 bits | D_$SNR_{scidx(0), 1}$ as defined in Equation (2) |
| | . . . | . . . | . . . |
| | Differential SNR for space-tune stream Nc for subcarrier k = scidx(0) | 8 bits | D_$SNR_{scidx(0), Nc}$ as defined in Equation (2) |
| | Differential SNR for space-time stream 1 for subcarrier k = scidx(1) | 4 bits | D_$SNR_{scidx(1), 1}$ as defined in Equation (1) |
| | . . . | . . . | . . . |
| | Differential SNR for space-time stream Nc for subcarrier k = scidx(1) | 4 bits | D_$SNR_{scidx(1), Nc}$ as defined in Equation (1) |
| | . . . | . . . | . . . |
| | Differential SNR for space-time stream 1 for subcarrier k = scidx($N_{SC}$ − 1) | 4 bits | D_$SNR_{scidx(Nsc-1), 1}$ as defined in Equation (1) |
| | . . . | . . . | . . . |
| | Differential SNR for space-time stream Nc for subcarrier k = scidx($N_{SC}$ − 1) | 4 bits | D_$SNR_{scidx(Nsc-1), Nc}$ as defined in Equation (1) |

According to Table 7 above, the differential subcarrier index exists only when Ng is set to a value representing dynamic grouping. When the dynamic grouping is used, a distance between any adjacent subcarriers other than an edge subcarrier or a DC subcarrier is one of values indicated in a grouping field.

When the Grouping subfield within the Digital Fbck Control field is less than or equal to 2, the subcarrier indices for which the beamforming matrices are computed are defined in Table 8. When the Grouping subfield within the Digital Fbck Control field is 3, the Digital BF Feedback element includes the Differential Subcarrier Index field marking the number of subcarriers between each two adjacent subcarriers within the feedback report. The subcarrier index set is constructed such that it is a subset of the subcarrier index set defined for Ng=2 and the corresponding $N_{CB}$ in Table 4, such that the edge subcarriers and the subcarriers with indices −2 and 2 are present within the feedback report and the distance between subcarriers within the feedback report is one of the values in {1, 2, 4, 8, 16, 32}.

TABLE 8

| NCB | Ng | Nsc | Subcarriers for which compressed feedback beamforming matrix is sent: scidx(0), scidx(1), ..., scidx($N_{sc}$ − 1). Note that DC subcarriers (0, ±1) are skipped. |
|---|---|---|---|
| 1 | 2 | 178 | −177, −176, −174, −172, −170, −168, −166, −164, −162, −160, −158, −156, −154, −152, −150, −148, −146, −144, −142, −140, −138, −136, −134, −132, −130, −128, −126, −124, −122, −120, −118, −116, −114, −112, −110, −108, −106, −104, −102, −100, −98, −96, −94, −92, −90, −88, −86, −84, −82, −80, −78, −76, −74, −72, −70, −68, −66, −64, −62, −60, −58, −56, −54, −52, −50, −48, −46, 44, −42, −40, −38, −36, −34, −32, −30, −28, −26, −24, −22, −20, −18, −16, −14, −12, −10, −8, −6, −4, −2, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 118, 120, 122, 124, 126, 128, 130, 132, 134, 136, 138, 140, 142, 144, 146, 148, 150, 152, 154, 156, 158, 160, 162, 164, 166, 168, 170, 172, 174, 176, 177 |
|  | 4 | 90 | −177, −174, −170, −166, −162, −158, −154, −150, −146, −142, −138, −134, −130, −126, −122, −118, −114, −110, −106, −102, −98, −94, −90, −86, −82, −78, −74, −70, −66, −62, −58, −54, −50, −46, −42, −38, −34, −30, −26, −22, −18, −14, −10, −6, −2, 2, 6, 10, 14, 18, 22, 26, 30, 34, 38, 42, 46, 50, 54, 58, 62, 66, 70, 74, 78, 82, 86, 90, 94, 98, 102, 106, 110, 114, 118, 122, 126, 130, 134, 138, 142, 146, 150, 154, 158, 162, 166, 170, 174, 177 |
|  | 8 | 46 | −177, −170, −162, −154, −146, −138, −130, −122, −114, −106, −98, −90, −82, −74, −66, −58, −50, −42, −34, −26, −18, −10, −2, 2, 10, 18, 26, 34, 42, 50, 58, 66, 74, 82, 90, 98, 106, 114, 122, 130, 138, 146, 154, 162, 170, 177 |
| 2 | 2 | 388 | −386, −385, −383, −381, −379, −377, −375, −373, −371, −369, −367, −365, −363, −361, −359, −357, −355, −353, −351, −349, −347, −345, −343, −341, −339, −337, −335, −333, −331, −329, −327, −325, −323, −321, −319, −317, −315, −313, −311, −309, −307, −305, −303, −301, −299, −297, −295, −293, −291, −289, −287, −285, −283, −281, −279, −277, −275, −273, −271, −269, −267, −265, −263, −261, −259, −257, −255, −253, −251, −249, −247, −245, −243, −241, −239, −237, −235, −233, −231, −229, −227, −225, −223, −221, −219, −217, −215, −213, −211, −209, −207, −205, −203, −201, −199, −197, −195, −193, −191, −189, −187, −185, −183, −181, −179, −177, −176, −174, −172, −170, −168, −166, −164, −162, −160, −158, −156, −154, −152, −150, −148, −146, −144, −142, −140, −138, −136, −134, −132, −130, −128, −126, −124, −122, −120, −118, −116, −114, −112, −110, −108, −106, −104, −102, −100, −98, −96, −94, −92, −90, −88, −86, −84, −82, −80, −78, −76, −74, −72, −70, −68, −66, −64, −62, −60, −58, −56, −54, −52, −50, −48, −46, −44, −42, 40, −38, −36, −34, −32, −30, −28, −26, −24, −22, −20, −18, −16, −14, −12, −10, −8, −6, −4, −2, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 118, 120, 122, 124, 126, 128, 130, 132, 134, 136, 138, 140, 142, 144, 146, 148, 150, 152, 154, 156, 158, 160, 162, 164, 166, 168, 170, 172, 174, 176, 177, 179, 181, 183, 185, 187, 189, 191, 193, 195, 197, 199, 201, 203, 205, 207, 209, 211, 213, 215, 217, 219, 221, 223, 225, 227, 229, 231, 233, 235, 237, 239, 241, 243, 245, 247, 249, 251, 253, 255, 257, 259, 261, 263, 265, 267, 269, 271, 273, 275, 277, 279, 281, 283, 285, 287, 289, 291, 293, 295, 297, 299, 301, 303, 305, 307, 309, 311, 313, 315, 317, 319, 321, 323, 325, 327, 329, 331, 333, 335, 337, 339, 341, 343, 345, 347, 349, 351, 353, 355, 357, 359, 361, 363, 365, 367, 369, 371, 373, 375, 377, 379, 381, 383, 385, 386 |
|  | 4 | 196 | −386, −385, −381, −377, −373, −369, −365, −361, −357, −353, −349, −345, −341, −337, −333, −329, −325, −321, −317, −313, −309, −305, −301, −297, −293, −289, −285, −281, −277, −273, −269, −265, −261, −257, −253, −249, −245, −241, −237, −233, −229, −225, −221, −217, −213, −209, −205, −201, −197, −193, −189, −185, −181, −177, −174, −170, −166, −162, −158, −154, −150, −146, −142, −138, −134, −130, −126, −122, −118, −114, −110, −106, −102, −98, −94, −90, −86, −82, −78, −74, −70, −66, −62, −58, −54, −50, −46, −42, −38, −34, −30, −26, −22, −18, −14, −10, −6, −2, 2, 6, 10, 14, 18, 22, 26, 30, 34, 38, 42, 46, 50, 54, 58, 62, 66, 70, 74, 78, 82, 86, 90, 94, 98, 102, 106, 110, 114, 118, 122, 126, 130, 134, 138, 142, 146, 150, 154, 158, 162, 166, 170, 174, 177, 181, 185, 189, 193, 197, 201, 205, 209, 213, 217, 221, 225, 229, 233, 237, 241, 245, 249, 253, 257, 261, 265, 269, 273, 277, 281, 285, 289, 293, 297, 301, 305, 309, 313, 317, 321, 325, 329, 333, 337, 341, 345, 349, 353, 357, 361, 365, 369, 373, 377, 381, 385, 386 |
|  | 8 | 101 | −386, −385, −377, −369, −361, −353, −345, −337, −329, −321, −313, −305, −297, −289, −281, −273, −265, −257, −249, −241, −233, −225, −217, −209, −201, −193, −185, −177, −170, −162, −154, −146, −138, −130, −122, −114, −106, −98, −90, −82, −74, −66, −58, −50, −42, −34, −26, −18, −10, −2, 2, 10, 18, 26, 34, 42, 50, 58, 62, 70, 78, 86, 94, 102, 110, 118, 126, 134, 142, 150, 158, 166, 174, 177, 185, 193, 201, 209, 217, 225, 233, 241, 249, 257, 265, 273, 281, 289, 297, 305, 313, 321, 329, 337, 345, 353, 361, 369, 377, 385, 386 |
| 3 | 2 | 598 | −596, −594, −592, −590, −588, −586, −584, −582, −580, −578, −576, −574, −572, −570, −568, −566, −564, −562, −560, −558, −556, −554, −552, −550, −548, −546, −544, −542, −540, −538, −536, −534, −532, −530, −528, −526, −524, −522, −520, −518, −516, −514, −512, −510, −508, −506, −504, −502, −500, −498, −496, −494, −492, −490, −488, −486, −484, −482, −480, −478, −476, −474, −472, −470, −468, −466, −464, −462, −460, −458, −456, −454, −452, −450, −448, −446, −444, −442, −440, −438, −436, −434, −432, −430, −428, −426, −424, −422, −420, −418, −416, −414, −412, −410, −408, −406, −404, −402, −400, −398, −396, −394, −392, −390, −388, −386, −385, −383, −381, −379, −377, −375, −373, −371, −369, −367, −365, −363, −361, −359, −357, −355, −353, −351, −349, −347, −345, −343, −341, −339, −337, −335, −333, −331, −329, −327, −325, −323, −321, −319, −317, −315, −313, −311, −309, −307, −305, −303, −301, −299, −297, −295, −293, −291, −289, −287, −285, −283, −281, −279, −277, −275, −273, −271, −269, −267, −265, −263, −261, −259, −257, −255, −253, −251, −249, −247, −245, −243, −241, −239, −237, −235, −233, −231, −229, −227, −225, −223, −221, −219, −217, −215, −213, −211, −209, −207, −205, −203, −201, −199, −197, −195, −193, −191, −189, −187, −185, −183, −181, −179, −177, −176, −174, −172, −170, −168, −166, −164, −162, −160, −158, −156, −154, −152, −150, −148, −146, −144, −142, −140, −138, −136, −134, −132, −130, −128, −126, −124, −122, −120, −118, −116, −114, −112, −110, −108, −106, −104, −102, −100, −98, −96, −94, −92, −90, −88, −86, −84, −82, −80, −78, −76, −74, −72, −70, −68, −66, −64, −62, −60, −58, −56, −54, −52, −50, −48, −46, −44, −42, −40, −38, −36, −34, −32, −30, −28, −26, −24, −22, −20, −18, −16, −14, −12, −10, −8, −6, −4, −2, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 118, 120, 122, 124, 126, 128, 130, 132, 134, 136, 138, 140, 142, 144, 146, 148, 150, 152, 154, 156, 158, 160, 162, 164, 166, 168, 170, 172, 174, 176, 177, 179, 181, 183, 185, 187, 189, 191, 193, 195, 197, 199, |

TABLE 8-continued

Subcarriers for which compressed feedback beamforming matrix is sent: scidx(0), scidx(1), ..., scidx($N_{sc}$ − 1). Note that DC subcarriers (0, ±1) are skipped.

| NCB | Ng | Nsc | scidx(0), scidx(1), ..., scidx($N_{sc}$ − 1) |
|---|---|---|---|
| | | | 201, 203, 205, 207, 209, 211, 213, 215, 217, 219, 221, 223, 225, 227, 229, 231, 233, 235, 237, 239, 241, 243, 245, 247, 249, 251, 253, 255, 257, 259, 261, 263, 265, 267, 269, 271, 273, 275, 277, 279, 281, 283, 285, 287, 289, 291, 293, 295, 297, 299, 301, 303, 305, 307, 309, 311, 313, 315, 317, 319, 321, 323, 325, 327, 329, 331, 333, 335, 337, 339, 341, 343, 345, 347, 349, 351, 353, 355, 357, 359, 361, 363, 365, 367, 369, 371, 373, 375, 377, 379, 381, 383, 385, 386, 388, 390, 392, 394, 396, 398, 400, 402, 404, 406, 408, 410, 412, 414, 416, 418, 420, 422, 424, 426, 428, 430, 432, 434, 436, 438, 440, 442, 444, 446, 448, 450, 452, 454, 456, 458, 460, 462, 464, 466, 468, 470, 472, 474, 476, 478, 480, 482, 484, 486, 488, 490, 492, 494, 496, 498, 500, 502, 504, 506, 508, 510, 512, 514, 516, 518, 520, 522, 524, 526, 528, 530, 532, 534, 536, 538, 540, 542, 544, 546, 548, 550, 552, 554, 556, 558, 560, 562, 564, 566, 568, 570, 572, 574, 576, 578, 580, 582, 584, 586, 588, 590, 592, 594, 596 |
| | 4 | 302 | −596, −594, −590, −586, −582, −578, −574, −570, −566, −562, −558, −554, −550, −546, −542, −538, −534, −530, −526, −522, −518, −514, −510, −506, −502, −498, −494, −490, −486, −482, −478, −474, −470, −466, −462, −458, −454, −450, −446, −442, −438, −434, −430, −426, −422, −118, −414, −410, −406, −402, −398, −394, −390, −386, −385, −381, −377, −373, −369, −365, −361, −357, −353, −349, −345, −341, −337, −333, −329, −325, −321, −317, −313, −309, −305, −301, −297, −293, −289, −285, −281, −277, −273, −269, −265, −261, −257, −253, −249, −245, −241, −237, −233, −229, −225, −221, −217, −213, −209, −205, −201, −197, −193, −189, −185, −181, −177, −174, −170, −166, −162, −158, −154, −150, −146, −142, −138, −134, −130, −126, −122, −118, −114, −110, −106, −102, −98, −94, −90, −86, −82, −78, −74, −70, −66, −62, −58, −54, −50, −46, −42, −38, −34, −30, −26, −22, −18, −14, −10, −6, −2, 2, 6, 10, 14, 18, 22, 26, 30, 34, 38, 42, 46, 50, 54, 58, 62, 66, 70, 74, 78, 82, 86, 90, 94, 98, 102, 106, 110, 114, 118, 122, 126, 130, 134, 138, 142, 146, 150, 154, 158, 162, 166, 170, 174, 177, 181, 185, 189, 193, 197, 201, 205, 209, 213, 217, 221, 225, 229, 233, 237, 241, 245, 249, 253, 257, 261, 265, 269, 273, 277, 281, 285, 289, 293, 297, 301, 305, 309, 313, 317, 321, 325, 329, 333, 337, 341, 345, 349, 353, 357, 361, 365, 369, 373, 377, 381, 385, 386, 390, 394, 398, 402, 406, 410, 414, 418, 422, 426, 430, 434, 438, 442, 446, 450, 454, 458, 462, 466, 470, 474, 478, 482, 486, 490, 494, 498, 502, 506, 510, 514, 518, 522, 526, 530, 534, 538, 542, 546, 550, 554, 558, 562, 566, 570, 574, 578, 582, 586, 590, 594, 596 |
| | 8 | 155 | −596, −594, −586, −578, −570, −562, −554, −546, −538, −530, −522, −514, −506, −498, −490, −482, −474, −466, −458, −450, −442, −434, −426, −418, −410, −402, −394, −386, −385, −377, −369, −361, −353, −345, −337, −329, −321, −313, −305, −297, −289, −281, −273, −265, −257, −249, −241, −233, −225, −217, −209, −201, −193, −185, −177, −170, −162, −154, −146, −138, −130, −122, −114, −106, −98, −90, −82, −74, −66, −58, −50, −42, −34, −26, −18, −10, −2, 2, 10, 18, 26, 34, 42, 50, 58, 62, 70, 78, 86, 94, 102, 110, 118, 126, 134, 142, 150, 158, 166, 174, 177, 185, 193, 201, 209, 217, 225, 233, 241, 249, 257, 265, 273, 281, 289, 297, 305, 313, 321, 329, 337, 345, 353, 361, 369, 377, 385, 386, 394, 402, 410, 418, 426, 434, 442, 450, 458, 466, 474, 482, 490, 498, 506, 514, 522, 530, 538, 546, 554, 562, 570, 578, 586, 594, 596 |
| 4 | 2 | 808 | −805, −804, −802, −800, −798, −796, −794, −792, −790, −788, −786, −784, −782, −780, −778, −776, −774, −772, −770, −768, −766, −764, −762, −760, −758, −756, −754, −752, −750, −748, −746, −744, −742, −740, −738, −736, −734, −732, −730, −728, −726, −724, −722, −720, −718, −716, −714, −712, −710, −708, −706, −704, −702, −700, −698, −696, −694, −692, −690, −688, −686, −684, −682, −680, −678, −676, −674, −672, −670, −668, −666, −664, −662, −660, −658, −656, −654, −652, −650, −648, −646, −644, −642, −640, −638, −636, −634, −632, −630, −628, −626, −624, −622, −620, −618, −616, −614, −612, −610, −608, −606, −604, −602, −600, −598, −596, −594, −592, −590, −588, −586, −584, −582, −580, −578, −576, −574, −572, −570, −568, −566, −564, −562, −560, −558, −556, −554, −552, −550, −548, −546, −544, −542, −540, −538, −536, −534, −532, −530, −528, −526, −524, −522, −520, −518, −516, −514, −512, −510, −508, −506, −504, −502, −500, −498, −496, −494, −492, −490, −488, −486, 484, −482, −480, 478, −476, −474, −472, −470, −468, −466, −464, −462, −460, −458, −456, −454, −452, 450, −448, −446, 444, −442, −440, −438, −436, −434, −432, −430, −428, −426, −424, −422, −420, −418, −416, −414, −412, −410, −408, −406, −404, −402, −400, −398, −396, −394, −392, −390, −388, −386, −385, −383, −381, −379, −377, −375, −373, −371, −369, −367, −365, −363, −361, −359, −357, −355, −353, −351, −349, −347, −345, −343, −341, −339, −337, −335, −333, −331, −329, −327, −325, −323, −321, −319, −317, −315, −313, −311, −309, −307, −305, −303, −301, −299, −297, −295, −293, −291, −289, −287, −285, −283, −281, −279, −277, −275, −273, −271, −269, −267, −265, −263, −261, −259, −257, −255, −253, −251, −249, −247, −245, −243, −241, −239, −237, −235, −233, −231, −229, −227, −225, −223, −221, −219, −217, −215, −213, −211, −209, −207, −205, −203, −201, −199, −197, −195, −193, −191, −189, −187, −185, −183, −181, −179, −177, −176, −177, −170, −168, −166, −164, −162, −160, −158, −156, −154, −152, −150, −148, −146, −144, −142, −140, −138, −136, −134, −132, −130, −128, −126, −124, −122, −120, −118, −116, −114, −112, −110, −108, −106, −104, −102, −100, −98, −96, −94, −92, −90, −88, −86, −84, −82, −80, −78, −76, −74, −72, −70, −68, −66, −64, −62, −60, −58, −56, −54, −52, −50, −48, −46, −44, −42, −40, −38, −36, −34, −32, −30, −28, −26, −24, −22, −20, −18, −16, −14, −12, −10, −8, −6, −4, −2, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 118, 120, 122, 124, 126, 128, 130, 132, 134, 136, 138, 140, 142, 144, 146, 148, 150, 152, 154, 156, 158, 160, 162, 164, 166, 168, 170, 172, 174, 176, 177, 179, 181, 183, 185, 187, 189, 191, 193, 195, 197, 199, 201, 203, 205, 207, 209, 211, 213, 215, 217, 219, 221, 223, 225, 227, 229, 231, 233, 235, 237, 239, 241, 243, 245, 247, 249, 251, 253, 255, 257, 259, 261, 263, 265, 267, 269, 271, 273, 275, 277, 279, 281, 283, 285, 287, 289, 291, 293, 295, 297, 299, 301, 303, 305, 307, 309, 311, 313, 315, 317, 319, 321, 323, 325, 327, 329, 331, 333, 335, 337, 339, 341, 343, 345, 347, 349, 351, 353, 355, 357, 359, 361, 363, 365, 367, 369, 371, 373, 375, 377, 379, 381, 383, 385, 386, 388, 390, 392, 394, 396, 398, 400, 402, 404, 406, 408, 410, 412, 414, 416, 418, 420, 422, 424, 426, 428, 430, 432, 434, 436, 438, 440, 442, 444, 446, 448, 450, 452, 454, 456, 458, 460, 462, 464, 466, 468, 470, 472, 474, 476, 478, 480, 482, 484, 486, 488, 490, 492, 494, 496, 498, 500, 502, 504, 506, 508, 510, 512, 514, 516, 518, 520, 522, 524, 526, 528, 530, 532, 534, 536, 538, 540, 542, 544, 546, 548, 550, 552, 554, 556, 558, 560, 562, 564, 566, 568, 570, 572, 574, 576, 578, 580, 582, 584, 586, 588, 590, 592, 594, 596, 598, 600, 602, 604, 606, 608, 610, 612, 614, 616, 618, 620, 622, 624, 626, 628, 630, 632, 634, 636, 638, 640, 642, 644, 646, 648, 650, 652, 654, 656, 658, 660, 662, 664, 666, 668, 670, 672, 674, 676, 678, 680, 682, 684, 686, 688, 690, 692, 694, 696, 698, 700, 702, 704, 706, 708, 710, 712, 714, 716, 718, 720, 722, 724, 726, 728, 730, 732, 734, 736, 738, 740, 742, |

TABLE 8-continued

Subcarriers for which compressed feedback beamforming matrix is sent: scidx(0), scidx(1), ..., scidx(N$_{sc}$ − 1). Note that DC subcarriers (0, ±1) are skipped.

| NCB | Ng | Nsc | |
|---|---|---|---|
| | | | 744, 746, 748, 750, 752, 754, 756, 758, 760, 762, 764, 766, 768, 770, 772, 774, 776, 778, 780, 782, 784, 786, 788, 790, 792, 794, 796, 798, 800, 802, 804, 805 |
| | 4 | 409 | −805, −804, −800, −796, −792, −788, −784, −780, −776, −772, −768, −764, −760, −756, −752, −748, −744, −740, −736, −732, −728, −724, −720, −716, −712, −708, −704, −700, −696, −692, −688, −684, −680, −676, −672, −668, −664, −660, −656, −652, −648, −644, −640, −636, −632, −628, −624, −620, −616, −612, −608, −604, −600, −596, −594, −590, −586, −582, −578, −574, −570, −566, −562, −558, −554, −550, −546, −542, −538, −534, −530, −526, −522, −518, −514, −510, −506, −502, −498, −494, −490, −486, −482, −478, −474, −470, −466, −462, −458, −454, −450, −446, −442, −438, −434, −430, −426, −422, −418, −414, −410, −406, −402, −398, −394, −390, −386, −385, −381, −377, −373, −369, −365, −361, −357, −353, −349, −345, −341, −337, −333, −329, −325, −321, −317, −313, −309, −305, −301, −297, −293, −289, −285, −281, −277, −273, −269, −265, −261, −257, −253, −249, −245, −241, −237, −233, −229, −225, −221, −217, −213, −209, −205, −201, −197, −193, −189, −185, −181, −177, −174, −170, −166, −162, −158, −154, −150, −146, −142, −138, −134, −130, −126, −122, −118, −114, −110, −106, −102, −98, −94, −90, −86, −82, −78, −74, −70, −66, −62, −58, −54, −50, −46, −42, −38, −34, −30, −26, −22, −18, −14, −10, −6, −2, 2, 6, 10, 14, 18, 22, 26, 30, 34, 38, 42, 46, 50, 54, 58, 62, 66, 70, 74, 78, 82, 86, 90, 94, 98, 102, 106, 110, 114, 118, 122, 126, 130, 134, 138, 142, 146, 150, 154, 158, 162, 166, 170, 174, 177, 181, 185, 189, 193, 197, 201, 205, 209, 213, 217, 221, 225, 229, 233, 237, 241, 245, 249, 253, 257, 261, 265, 269, 273, 277, 281, 285, 289, 293, 297, 301, 305, 309, 313, 317, 321, 325, 329, 333, 337, 341, 345, 349, 353, 357, 361, 365, 369, 373, 377, 381, 385, 386, 390, 394, 398, 402, 406, 410, 414, 418, 422, 426, 430, 434, 438, 442, 446, 450, 454, 458, 462, 466, 470, 474, 478, 482, 486, 490, 494, 498, 502, 506, 510, 514, 518, 522, 526, 530, 534, 538, 542, 546, 550, 554, 558, 562, 566, 570, 574, 578, 582, 586, 590, 594, 596, 596, 600, 604, 608, 612, 616, 620, 624, 628, 632, 636, 640, 644, 648, 652, 656, 660, 664, 668, 672, 676, 680, 684, 688, 692, 696, 700, 704, 708, 712, 716, 720, 724, 728, 732, 736, 740, 744, 748, 752, 756, 760, 764, 768, 772, 776, 780, 784, 788, 792, 796, 800, 804, 805 |
| | 8 | 209 | −805, −804, −796, −788, −780, −772, −764, −756, −748, −740, −732, −724, −716, −708, −700, −692, −684, −676, −668, −660, −652, −644, −636, −628, −620, −612, −604, 596, −594, −586, −578, −570, −562, −554, −546, −538, −530, −522, −514, −506, −498, −490, −482, −474, −466, −458, −450, −442, −434, −426, −418, −410, −402, −394, −386, −385, −377, −369, −361, −353, −345, −337, −329, −321, −313, −305, −297, −289, −281, −273, −265, −257, −249, −241, −233, −225, −217, −209, −201, −193, −185, −177, −170, −162, −154, −146, −138, −130, −122, −114, −106, −98, −90, −82, −74, −66, −58, −50, −42, −34, −26, −18, −10, −2, 2, 10, 18, 26, 34, 42, 50, 58, 62, 70, 78, 86, 94, 102, 110, 118, 126, 134, 142, 150, 158, 166, 174, 177, 185, 193, 201, 209, 217, 225, 233, 241, 249, 257, 265, 273, 281, 289, 297, 305, 313, 321, 329, 337, 345, 353, 361, 369, 377, 385, 386, 394, 402, 410, 418, 426, 434, 442, 450, 458, 466, 474, 482, 490, 498, 506, 514, 522, 530, 538, 546, 554, 562, 570, 578, 586, 594, 596, 604, 612, 620, 628, 636, 644, 652, 660, 668, 676, 684, 692, 700, 708, 716, 724, 732, 740, 748, 756, 764, 772, 780, 788, 796, 804, 805 |

In Table 8 above, a case of Ng=16 may be added. In the case of Ng=16a, an index of a feedback subcarrier may be defined as follows.

4.1) In Case of Considering a Nested Structure of Channel Bonding

This case is for a method of determining a subcarrier index advantageously in terms of HW implementation. 4CB subcarrier indices include locations of subcarriers of all channel bonding factors with a nested structure in which subcarrier indices of a single channel are included in 2CB subcarrier indices, 2CB is included in 3CB, and 3CB is included in 4CB.

Since DC is located at −1, 0, 1, this is excluded when determining feedback subcarrier indices. In addition, for channel estimation of this portion, grouping starts from subcarriers −2 and 2.

<1CB>
[−177, −162, −146, −130, −114, −98, −82, −66, −50, −34, −18, −2,2,18, 34, 50,66,82, 98,114, 130, 146, 162, 177]

In case of the single channel, subcarriers −178 and 178 cannot be used since data subcarriers −177 to 177 are present. Although a spacing of 16 subcarriers is not maintained, the subcarriers −117 and 177 are used for interpolation.

<2CB>
[−386,−385,−369,−353,−337,−321,−305,−289,−273, −257, −241, −225, −209, −193, −177, −162, −146, −130, −114, −98, −82, −66, −50, −34, −18, −2,2,18, 34, 50,66,82, 98,114, 130, 146, 162, 177, 193, 209, 225, 241,257, 273, 289,305, 321, 337,353,369,385, 386]

After subcarrier indices of the single channel are brought, a feedback is achieved with a spacing of 16 subcarriers with respect to the subcarrier −177 and 177. Likewise, edge carriers −386 and 386 are used as a subcarrier in which the feedback is achieved for interpolation.

<3CB>
[−596, −594, −578, −562, −546, −530, −514, −498, −482, −466, −450, −434, −418, −402, −386, −385, −369, −353, −337, −321, −305, −289, −273, −257, −241, −225, −209, −193, −177, −162, −146, −130, −114, −98, −82, −66, −50, −34, −18, −2,2,18, 34, 50,66,82, 98,114, 130, 146, 162, 177, 193, 209, 225, 241,257, 273,289,305, 321, 337,353,369,385, 386, 402, 418, 434, 450, 466, 482, 198,514,530,546, 562, 578,594, 596]

For subcarrier indices of 2CB, a feedback is achieved with a spacing of 16 subcarriers with respect to the subcarrier −386 and 386. Likewise, edge subcarriers −596 and 596 are used as a subcarrier in which the feedback is achieved for interpolation.

<4CB>
[−805, −804, −788, −772, −756, −740, −724, −708, −692, −676, −660, −644, −628, −612, −596, −594, −578, −562, −546, −530, −514, −498, −482, −466, −450, −434, −418, −402, −386, −385, −369, −353, −337, −321, −305, −289, −273, −257, −241, −225, −209, −193, −177, −162, −146, −130, −114, −98, −82, −66, −50, −34, −18, −2,2,18, 34, 50,66,82, 98,114, 130, 146, 162, 177, 193, 209, 225, 241, 257, 273,289,305, 321, 337,353,369,385, 386, 402, 418, 434, 450, 466, 482, 498,514,530,546, 562, 578,594, 596, 612,628,644, 660, 676,692,708,724,740, 756, 772,788, 804, 805]

For subcarrier indices of 3CB, a feedback is achieved with a spacing of 8 subcarriers with respect to the subcarrier −596 and 596. Likewise, edge subcarriers −805 and 805 are used as a subcarrier in which the feedback is achieved for interpolation.

4.2) In Case of not Considering a Nested Structure of Channel Bonding

Unlike in the case 4.1), feedback subcarrier indices are constructed for each channel bonding factor without using the nested structure. A feedback subcarrier is determined by considering a DC subcarrier and an edge subcarrier.

<1CB>
[−177 −162 −146 −130 −114 −98 −82 −66 −50 −34 −18 −2 2 10 18 26 34 50 66 82 98 114 130 146 162 177]

<2CB>
[−386 −370 −354 −338 −322 −306 −290 −274 −258 −242 −226 −210 −194 −178 −162 −146 −130 −114 −98 −82 −66 −50 −34 −18 −2 2 10 18 26 34 50 66 82 98 114 130 146 162 178 194 210 226 242 258 274 290 306 322 338 354 370 386]

<3CB>
[−596 −594 −578 −562 −546 −530 −514 −498 −482 −466 −450 −434 −418 −402 −386 −370 −354 −338 −322 −306 −290 −274 −258 −242 −226 −210 −194 −178 −162 −146 −130 −114 −98 −82 −66 −50 −34 −18 −2 2 10 18 26 34 50 66 82 98 114 130 146 162 178 194 210 226 242 258 274 290 306 322 338 354 370 386 402 418 434 450 466 482 498 514 530 546 562 578 594 596]

<4CB>
[−805 −802 −786 −770 −754 −738 −722 −706 −690 −674 −658 −642 −626 −610 −594 −578 −562 −546 −530 −514 −498 −482 −466 −450 −434 −418 −402 −386 −370 −354 −338 −322 −306 −290 −274 −258 −242 −226 −210 −194 −178 −162 −146 −130 −114 −98 −82 −66 −50 −34 −18 −2 2 10 18 26 34 50 66 82 98 114 130 146 162 178 194 210 226 242 258 274 290 306 322 338 354 370 386 402 418 434 450 466 482 498 514 530 546 562 578 594 610 626 642 658 674 690 706 722 738 754 770 786 802 805]

As described above, the MU exclusive field exists for MU-MIMO in 802.11ac. In this case, a per-tone-SNR value is defined for each feedback tone. This value is used for a feedback of additional information.

In case of MU-MIMO, regarding the information to be fed back additionally, a delta-SNR is defined as an average SNR per space-time stream in VHT compressed beamforming report information and a per-tone-SNR value of each feedback tone, and this value is fed back.

In 11ac, Ng is a tone grouping factor for a feedback tone (Ng=1, 2, 4). If Ng is 1, a feedback is achieved for all tones, and if Ng is 2, the feedback is achieved with an interval of 2 tones.

In case of the delta-SNR, additional information is fed back for MU-MIMO with an interval of 2*Ng.

In case of 11ax, the additional information is fed back for MU-MIMO with an interval of Ng.

The present invention proposes a MU exclusive field for MU-MIMO in 802.11ay. Instead of utilizing the delta-SNR method used in the conventional 11ac, a differential SNR method is proposed.

5. Proposed Embodiment

A per-tone-SNR is predefined in 802.11ac as follows. That is, an SNR per tone for a subcarrier k and a space-time stream i may be obtained by the equation below.

$$SNR_{k,i} = 10\log_{10}\left(\frac{\|H_k V_{k,i}\|^2}{N}\right) \quad \text{[Equation 2]}$$

Herein, $V_{k,i}$ is a column i of a feedback beamforming matrix at a subcarrier k, and N is a noise plus interference power, measured in a beamformee.

A delta-SNR is fed back by defining the delta-SNR as a difference between a per-tone-SNR value and an average SNR value of a space-time stream. 4 bits are used, and the feedback is achieved with a 1 dB step in the range of −8 dB to 7 dB.

That is, the delta-SNR included in the MU exclusive beamforming report information defined in 802.11ac may be defined by Table 4 below.

A method in which a MU exclusive field is additionally added for MU-MIMO is also proposed in 802.11ay.

In the proposed method, although the per-tone-SNR is used similarly to 11ac, instead of using the difference between the value and the average SNR value, a difference between adjacent tones is defined as a differential SNR and the difference is fed back.

With a method of considering a characteristic of the 11ay channel, in case of the 11ay channel, frequency selectivity of the channel increases due to a reflection characteristic.

For example, when it is assumed that an average SNR of a space-time stream is 10 dB, there may be a case where a per-tone-SNR value of each data tone is decreased to be less than 2 dB or increased to be greater than 17 dB.

A method of 802.11ac cannot cover the aforementioned cases.

In this case, a method of feeding back a per-tone-SNR difference between adjacent tones may be considered instead of using the method of 802.11ac.

A differential SNR representing a relative per-tone-SNR difference between the adjacent tones may be obtained by the equation below.

$$D_{SNR_{k,i}} = 10\log_{10}\left(\frac{\|H_k V_{k,i}\|^2}{N}\right) - 10\log_{10}\left(\frac{\|H_{k-1} V_{k-1,i}\|^2}{N}\right) \quad \text{[Equation 3]}$$

Herein, k is a feedback subcarrier index, i is a stream index, H is an estimated channel, V is a beamforming matrix, and N is an average noise plus interference power.

The differential SNR may be obtained by the equation below. Equation 3 and Equation 4 may be the same equation.

$$D\_SNR_{k,i} = \min\left(\max\left(\text{round}\left(10\log_{10}\left(\frac{\|H_k V_{k,i}\|^2}{N}\right) - 10\log_{10}\left(\frac{\|H_{\tilde{k}} V_{\tilde{k},i}\|^2}{N}\right)\right), -8\right), 7\right) \quad \text{[Equation 4]}$$

where:
k is the subcarrier index in the range scidx(1), . . . , scidx($N_{SC}$−1)
$\tilde{k}$ is the subcarrier index in the range scidx(0), . . . , scidx($N_{SC}$−2)
i is the space-time stream index in the range 1, . . . , Nc
$H_k$ is the estimated MIMO channel for subcarrier k
$V_{k,i}$ is column i of the beamforming matrix V for subcarrier k N is the average noise plus interference power, measured at the responder Herein, a per-tone-SNR value of a first data tone cannot be determined differentially since there is no comparison target (a location of the first data tone may be the leftmost subcarrier or the rightmost subcarrier in the tone index table of the prior art). A minimum value may be set to −10 dB, a maximum value may be set to 53.75 dB, and then values may be determined with a 0.5 dB step by using 8 bits. The minimum and maximum values may be changed and the step can be set to a 1 dB step.

Therefore, a per-tone SNR value of the first data tone shall be expressed by allocating 8 bits similarly to an average SNR value of a space-time stream.

The per-tone SNR value of the first data tone may be calculated by the equation below.

$$D\_SNR_{scidx(0),i} = 10\log_{10}\left(\frac{\|H_{scidx(0)}V_{scidx(0),i}\|^2}{N}\right) \quad \text{[Equation 5]}$$

The MU exclusive beamforming report field transfers explicit feedback information in the form of a differential SNR included in the differential SNR subfield. The MU exclusive beamforming report field is included in the digital BF feedback element when the SU/MU field of the MIMO feedback control element is 1 (MU transmission) and the feedback type subfield of the digital Fbck control field is 1 (EDMG OFDM mode).

In the MU exclusive beamforming report field, a subset of subcarriers spaced apart by Ng consists of differential SNR subfields for each space-time stream (1 to Nc). Ng is a value of a grouping subfield of the digital Fbck control field in the MIMO feedback control element, and is used with a subcarrier spacing from the lowest frequency subcarrier to the highest frequency subcarrier. Even in case of corresponding to different subcarriers, there is no padding between $D\_SNR_{k,i}$ in the MU exclusive beamforming report field.

The subset of the subcarriers spaced apart by Ng is determined by the value of Table 8 above. For each of the subcarriers included in the subset, a dB deviation of an SNR of a subcarrier for each column of a matrix V for adjacent subcarriers spaced apart by Ng of a corresponding space-time stream may be calculated by using Equation 4 above.

Each differential SNR subfield includes $D\_SNR_{k,i}$ which is calculated through Equation 4 and quantized with 4 bits in the range of −8 dB to 7 dB with a granularity of 1 dB (however, a case of a subcarrier index k=scidx(0) is excluded). When k=scidx(0), $D\_SNR_{scidx(0),i}$ is calculated by using Equation 5 above, and is quantized with 8 bits in the range of −8 dB to 55.75 dB with a granularity of 0.25 dB.

When using this method as a method of utilizing a characteristic in which a per-tone-SNR between adjacent tones does not significantly change even if frequency selectivity increases, advantageously, it is possible to feed back values which cannot be covered in the above case.

1) As in the conventional case, 4 bits may be allocated for feedback of a 1 dB step in the range of −8 dB to 7 dB or a 1 dB step in the range of −7 dB to 8 dB.

2) Alternatively, 3 bits may be allocated for feedback of a 2 dB step in the range of −4 dB to 3 dB or a 1 dB step in the range from −3 dB to 4 dB. Advantageously, a feedback overhead can be decreased when the 3 bits are allocated.

3) 4 bits may be allocated for feedback of a 0.5 dB step in the range of −4 dB to 3.5 dB. Advantageously, a per-tone-SNR can be reported more accurately when the feedback is achieved by decreasing a step interval.

The method of the case 1) is described in detail as follows.

It is assumed that a feedback subcarrier consists of a first tone, a second tone, a third tone, a fourth tone, or the like. Herein, it is assumed that an SNR of the first tone is 10 dB, an SNR of the second tone is 18 dB, and an SNR of the third tone is 15 dB, and an SNR of the fourth tone is 20 dB.

According to the above embodiment, since the first tone is a first data tone, a differential SNR cannot be defined. Therefore, a per-tone-SNR value of the first data tone may be expressed by allocating 8 bits similarly to an average SNR value of a space-time stream, and may be calculated using Equation 5 above.

A differential SNR with respect to a previous tone can be obtained starting from the second tone. A difference between an SNR of the second tone and an SNR of a third tone is 8 dB. Since an upper limit is 7 dB according to the case 1), the differential SNR may be set to 7 dB. Therefore, the differential SNR may be expressed by feeding back a per-tone-SNR difference between adjacent tones by allocating 4 bits, and may be calculated using Equation 4 above.

A difference between the SNR of the third tone and the SNR of the second tone is 3 dB. Since 3 dB is included in the range of the upper and lower limit according to the case 1), the differential SNR may be set to 3 dB. Therefore, the differential SNR may be expressed by feeding back a per-tone SNR difference between adjacent tones by allocating 4 bits, and may be calculated using Equation 4 above.

A difference between an SNR of a fourth tone and the SNR of the third tone is 5 dB. Since 5 dB is included in the range of the upper and lower limit according to the case 1), the differential SNR may be set to 5 dB. Therefore, the differential SNR may be expressed by feeding back a per-tone SNR difference between adjacent tones by allocating 4 bits, and may be calculated using Equation 4 above.

A tone interval for SNR measurement is proposed as follows.

When hybrid beamforming feedback is achieved in an OFDM mode, a grouping value Ng is defined to feed back a beamforming matrix with an interval of Ng tones (Ng=2, 4, 8).

A data tone for reporting a per-tone SNR may utilize the aforementioned Ng.

An index of the data tone may use a subcarrier index described in Table 8 above.

i) A method may be considered in which a per-tone-SNR is measured with an interval of Ng and thereafter a per-tone-SNR difference of adjacent tones is fed back. Advantageously, a pre-defined parameter can be utilized without an additional factor for the per-tone-SNR.

ii) A method may be considered in which a per-tone-SNR is measured with an interval of 2*Ng and thereafter a per-tone-SNR difference is fed back. Advantageously, a feedback overhead can be decreased by increasing the interval when there is no significant change.

For example, if Ng=2, when the per-tone-SNR is measured with an interval of Ng, an index is utilized for each channel bonding for the case of Ng=2 in the conventional technique. When the per-tone-SNR is measured with an interval of 2*Ng, an index defined in the table for each channel bonding is used if Ng=4.

If Ng=8, when the per-tone-SNR is measured with an interval of Ng, an index is utilized for each channel bonding for the case of Ng=8 in the conventional technique. When the per-tone-SNR is measured with an interval of 2*Ng, an index defined in the table for each channel bonding is used if Ng=16.

iii) Alternatively, in addition to the above methods, a method may be considered in which the per-tone-SNR is measured and reported for all data tones.

Advantageously, SNR information of a channel can be fed back more accurately when a per-tone-SNR is measured and fed back for all data tones in a poor channel situation.

Figure 17:
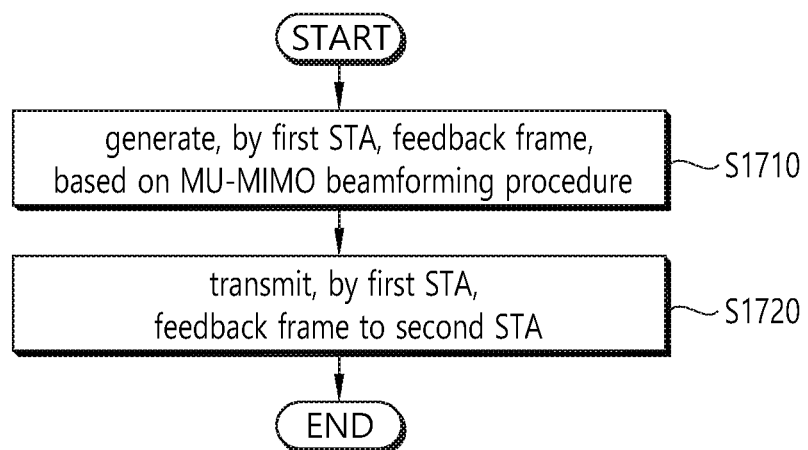
FIG. 17 is a flowchart showing a procedure in which a transmitting device transmits a feedback frame to perform MIMO beamforming according to the present embodiment.

FIG. 17 is a flowchart showing a procedure in which a transmitting device transmits a feedback frame to perform MIMO beamforming according to the present embodiment.

The present embodiment proposes a method of configuring an additional report field for MU-MIMO beamforming in a compressed beamforming feedback process during a hybrid beamforming procedure. Conventionally, the report field to be added includes a difference between an SNR per feedback subcarrier and an average SNR value. However, the present embodiment proposes a method of decreasing the number of bit for a feedback by including a differential SNR which is a difference between adjacent subcarriers.

First, summarizing terminologies, a first STA may correspond to a responder for performing MIMO beamforming, and a second STA may correspond to an initiator for performing MIMO beamforming. Since the MIMO beamforming described in the present embodiment relates to multi user (MU)-MIMO beamforming, a plurality of first STAs may be present. A subcarrier may correspond to a tone.

In step S1710, the first STA generates a feedback frame based on multi user (MU)-multi input multi output (MIMO) beamforming. The MIMO beamforming may include a sounding procedure for transmitting/receiving a beam refinement protocol or beam refinement phase (BRP) packet (or frame).

In step S1720, the feedback frame is transmitted to the second STA.

The feedback frame may be defined as follows.

The feedback frame includes information related to a feedback subcarrier for a predetermined frequency band and a beamforming report field for the MU-MIMO beamforming.

The feedback subcarrier includes a first subcarrier transmitted first in the feedback subcarrier and a second subcarrier of which a subcarrier index is determined based on a grouping value related to a subcarrier spacing. The second subcarrier may be a feedback subcarrier excluding the first subcarrier.

The first subcarrier is set to one of a left edge subcarrier or right edge subcarrier of the predetermined frequency band.

The beamforming report field includes a first signal to noise ratio (SNR) for the first subcarrier and a first differential SNR for the second subcarrier.

The first differential SNR is an SNR difference between adjacent subcarriers included in the feedback subcarrier.

That is, the first SNR for the first subcarrier cannot be set to the differential SNR since the first subcarrier does not have a comparison target. Therefore, the SNR value may be fed back for the first subcarrier, and the differential SNR may be fed back from the second subcarrier which is a feedback subcarrier excluding the first subcarrier. That is, the feedback subcarrier included in the second subcarrier is used to feed back the SNR difference between the adjacent subcarriers, thereby decreasing the number of feedback bits.

Specifically, the first SNR may be acquired for a space-time stream by using the equation below.

$$D\_SNR_{scidx(0),i} = 10\log_{10}\left(\frac{\|H_{scidx(0)}V_{scidx(0),i}\|^2}{N}\right)$$

$H_{scidx(0)}$ may be an estimated MIMO channel for the first subcarrier.

$V_{scidx(0),i}$ may be a column i of a beamforming matrix V for the first subcarrier.

i may be an index of the space-time stream.

N may be an average noise plus interference power, measured from the first STA.

scidx(0) is a first subcarrier index which may be expressed as a subcarrier index 1, and may be a subcarrier index of the first subcarrier.

The first SNR may have a granularity of 0.25 dB, a minimum value of −8 dB, and a maximum value of 55.75 dB. The first SNR may be quantized with 8 bits based on the granularity, the minimum value, and the maximum value. The first SNR may be indicated by a value in the range of −8 dB to 55.75 dB with a 0.25 dB step by using the 8 bits.

The first differential SNR may be acquired for a space-time stream based on the equation below.

$$D_{SNR_{k,i}} = 10\log_{10}\left(\frac{\|H_k V_{k,i}\|^2}{N}\right) - 10\log_{10}\left(\frac{\|H_{k-1}V_{k-1,i}\|^2}{N}\right)$$

k may be a subcarrier index of the second subcarrier.

$H_k$ may be an estimated MIMO channel for a feedback subcarrier k.

$V_{k,i}$ may be a column i of a beamforming matrix V for the feedback subcarrier k.

i may be an index of the space-time stream.

N may be an average noise plus interference power, measured from the first STA.

The first differential SNR may have a granularity of 1 dB, a minimum value of −8 dB, and a maximum value of 7 dB. The first differential SNR may be quantized with 4 bits based on the granularity, the minimum value, and the maximum value. The first differential SNR may be indicated by a value in the range of −8 dB to 7 dB with a 1 dB step by using the 4 bits An embodiment of the first differential SNR is described below in detail.

If a subcarrier index of the first subcarrier is 1, the second subcarrier may include a third subcarrier of which a subcarrier index is 2 and a fourth subcarrier of which a subcarrier index is 3.

A second differential SNR for the third subcarrier may be an SNR difference between the first subcarrier and the third subcarrier. The second differential SNR may be acquired based on the equation above when k=2. The equation above may be Equation 3 or 4. Specifically, the second differential SNR may be set to an SNR difference value between the first SNR and the second SNR for the third subcarrier. However, the SNR difference value may be limited in the range of the minimum value (−8 dB) to the maximum value (7 dB).

A third differential SNR for the fourth subcarrier may be an SNR difference between the second subcarrier and the third subcarrier. The third differential SNR may be acquired based on the equation above when k=3. The equation above may be Equation 3 or 4. Specifically, the third differential SNR may be set to an SNR difference value between the second SNR and the third SNR for the fourth subcarrier.

However, the SNR difference value may be limited in the range of the minimum value (−8 dB) to the maximum value (7 dB).

The fourth subcarrier may be a feedback subcarrier spaced apart from the third subcarrier by the grouping value.

That is, in the feedback subcarrier having a spacing of the grouping value, an SNR may be measured for each subcarrier. The SNR value may be directly fed back for the first subcarrier transmitted first among the feedback subcarriers, and an SNR difference between adjacent subcarriers may be fed back starting from the second subcarrier.

The predetermined frequency band may be set for a single channel, two bonded channels, three bonded channels, or four bonded channels, The grouping value may be set to one of values 2, 4, 8, and 16.

Figure 18:
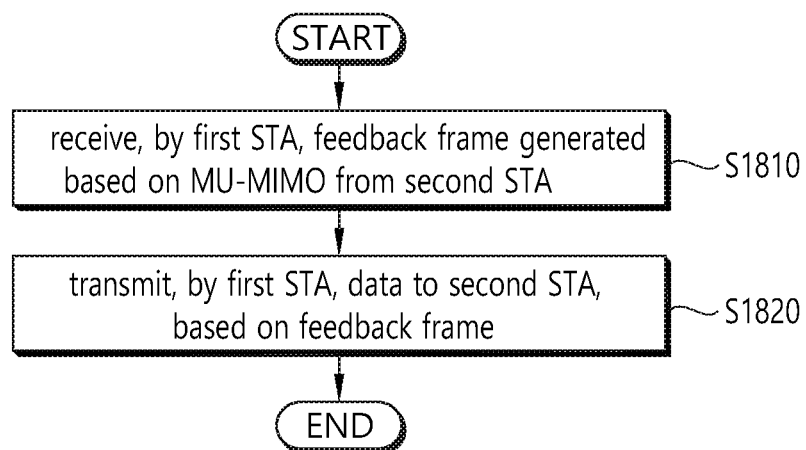
FIG. 18 is a flowchart showing a procedure in which a receiving device receives a feedback frame to perform MIMO beamforming according to the present embodiment.

FIG. 18 is a flowchart showing a procedure in which a receiving device receives a feedback frame to perform MIMO beamforming according to the present embodiment.

The present embodiment proposes a method of configuring an additional report field for MU-MIMO beamforming in a compressed beamforming feedback process during a hybrid beamforming procedure. Conventionally, the report field to be added includes a difference between an SNR per feedback subcarrier and an average SNR value. However, the present embodiment proposes a method of decreasing the number of bit for a feedback by including a differential SNR which is a difference between adjacent subcarriers.

First, summarizing terminologies, a first STA may correspond to a responder for performing MIMO beamforming, and a second STA may correspond to an initiator for performing MIMO beamforming. Since the MIMO beamforming described in the present embodiment relates to multi user (MU)-MIMO beamforming, a plurality of first STAs may be present. A subcarrier may correspond to a tone.

In step S1810, the first STA receives from the second STA a feedback frame generated based on multi user (MU)-multi input multi output (MIMO) beamforming. The MIMO beamforming may include a sounding procedure for transmitting/receiving a beam refinement protocol or beam refinement phase (BRP) packet (or frame).

In step S1820, the first STA transmits data to the second STA based on the feedback frame.

The feedback frame may be defined as follows.

The feedback frame includes information related to a feedback subcarrier for a predetermined frequency band and a beamforming report field for the MU-MIMO beamforming.

The feedback subcarrier includes a first subcarrier transmitted first in the feedback subcarrier and a second subcarrier of which a subcarrier index is determined based on a grouping value related to a subcarrier spacing. The second subcarrier may be a feedback subcarrier excluding the first subcarrier.

The first subcarrier is set to one of a left edge subcarrier or right edge subcarrier of the predetermined frequency band.

The beamforming report field includes a first signal to noise ratio (SNR) for the first subcarrier and a first differential SNR for the second subcarrier.

The first differential SNR is an SNR difference between adjacent subcarriers included in the feedback subcarrier.

That is, the first SNR for the first subcarrier cannot be set to the differential SNR since the first subcarrier does not have a comparison target. Therefore, the SNR value may be fed back for the first subcarrier, and the differential SNR may be fed back from the second subcarrier which is a feedback subcarrier excluding the first subcarrier. That is, the feedback subcarrier included in the second subcarrier is used to feed back the SNR difference between the adjacent subcarriers, thereby decreasing the number of feedback bits.

Specifically, the first SNR may be acquired for a space-time stream by using the equation below.

$$D\_SNR_{scidx(0),i} = 10\log_{10}\left(\frac{\|H_{scidx(0)}V_{scidx(0),i}\|^2}{N}\right)$$

$H_{scidx(0)}$ may be an estimated MIMO channel for the first subcarrier.

$V_{scidx(0),i}$ may be a column i of a beamforming matrix V for the first subcarrier.

i may be an index of the space-time stream.

N may be an average noise plus interference power, measured from the first STA.

scidx(0) is a first subcarrier index which may be expressed as a subcarrier index 1, and may be a subcarrier index of the first subcarrier.

The first SNR may have a granularity of 0.25 dB, a minimum value of −8 dB, and a maximum value of 55.75 dB. The first SNR may be quantized with 8 bits based on the granularity, the minimum value, and the maximum value. The first SNR may be indicated by a value in the range of −8 dB to 55.75 dB with a 0.25 dB step by using the 8 bits.

The first differential SNR may be acquired for a space-time stream based on the equation below.

$$D_{SNR_{k,i}} = 10\log_{10}\left(\frac{\|H_k V_{k,i}\|^2}{N}\right) - 10\log_{10}\left(\frac{\|H_{k-1}V_{k-1,i}\|^2}{N}\right)$$

k may be a subcarrier index of the second subcarrier.

$H_k$ may be an estimated MIMO channel for a feedback subcarrier k.

$V_{k,i}$ may be a column i of a beamforming matrix V for the feedback subcarrier k.

i may be an index of the space-time stream.

N may be an average noise plus interference power, measured from the first STA.

The first differential SNR may have a granularity of 1 dB, a minimum value of −8 dB, and a maximum value of 7 dB. The first differential SNR may be quantized with 4 bits based on the granularity, the minimum value, and the maximum value. The first differential SNR may be indicated by a value in the range of −8 dB to 7 dB with a 1 dB step by using the 4 bits An embodiment of the first differential SNR is described below in detail.

If a subcarrier index of the first subcarrier is 1, the second subcarrier may include a third subcarrier of which a subcarrier index is 2 and a fourth subcarrier of which a subcarrier index is 3.

A second differential SNR for the third subcarrier may be an SNR difference between the first subcarrier and the third subcarrier. The second differential SNR may be acquired based on the equation above when k=2. The equation above may be Equation 3 or 4. Specifically, the second differential SNR may be set to an SNR difference value between the first SNR and the second SNR for the third subcarrier. However, the SNR difference value may be limited in the range of the minimum value (−8 dB) to the maximum value (7 dB).

A third differential SNR for the fourth subcarrier may be an SNR difference between the second subcarrier and the third subcarrier. The third differential SNR may be acquired based on the equation above when k=3. The equation above may be Equation 3 or 4. Specifically, the third differential SNR may be set to an SNR difference value between the second SNR and the third SNR for the fourth subcarrier. However, the SNR difference value may be limited in the range of the minimum value (−8 dB) to the maximum value (7 dB).

The fourth subcarrier may be a feedback subcarrier spaced apart from the third subcarrier by the grouping value.

That is, in the feedback subcarrier having a spacing of the grouping value, an SNR may be measured for each subcarrier. The SNR value may be directly fed back for the first subcarrier transmitted first among the feedback subcarriers, and an SNR difference between adjacent subcarriers may be fed back starting from the second subcarrier.

The predetermined frequency band may be set for a single channel, two bonded channels, three bonded channels, or four bonded channels, The grouping value may be set to one of values 2, 4, 8, and 16.

Figure 19:
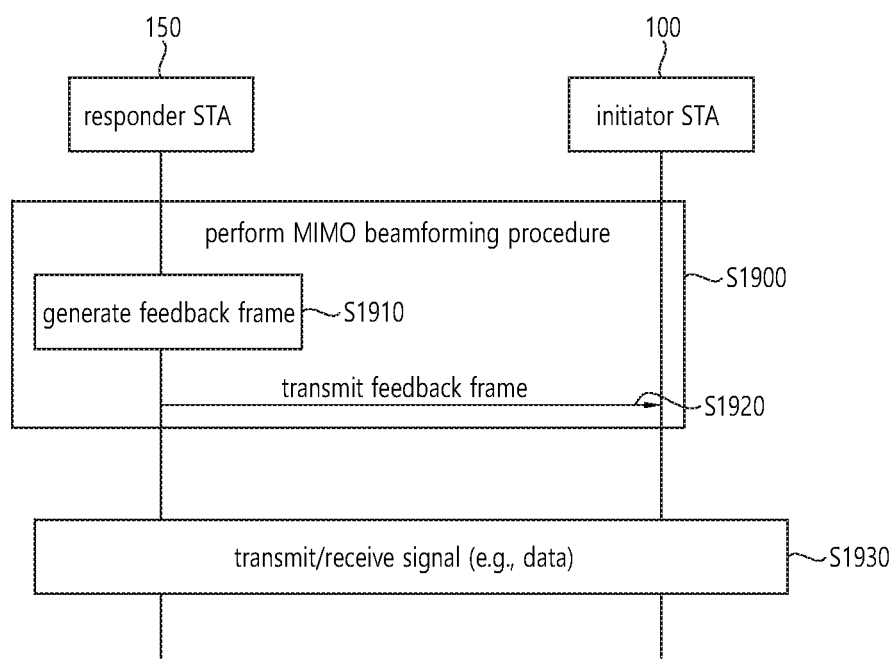
FIG. 19 shows a procedure of transmitting a feedback frame to perform MIMO beamforming according to the present embodiment.

FIG. 19 shows a procedure of transmitting a feedback frame to perform MIMO beamforming according to the present embodiment.

First, summarizing terminologies, a first STA may correspond to a responder 150 for performing MIMO beamforming, and a second STA may correspond to an initiator 100 for performing MIMO beamforming. The MIMO beamforming described in the present embodiment may correspond to single user (SU)-MIMO beamforming if there is one first STA, and may correspond to multi user (MU)-MIMO beamforming if there are a plurality of first STAs.

In step S1900, the first STA performs a MIMO beamforming procedure together with the second STA. The MIMO beamforming procedure may include steps S1910 and S1920.

In step S1910, the first STA generates a feedback frame based on a multi input multi output (MIMO) beamforming procedure. The MIMO beamforming procedure may include a sounding procedure for transmitting/receiving a beam refinement protocol or beam refinement phase (BRP) packet (or frame).

In step S1920, the first STA transmits the feedback frame to the second STA.

In step S1930, the first STA transmits/receives a signal based on the MIMO beamforming procedure.

The feedback frame may be defined as follows.

The feedback frame includes information related to a feedback subcarrier for a predetermined frequency band and a beamforming report field for the MU-MIMO beamforming.

The feedback subcarrier includes a first subcarrier transmitted first in the feedback subcarrier and a second subcarrier of which a subcarrier index is determined based on a grouping value related to a subcarrier spacing. The second subcarrier may be a feedback subcarrier excluding the first subcarrier.

The first subcarrier is set to one of a left edge subcarrier or right edge subcarrier of the predetermined frequency band.

The beamforming report field includes a first signal to noise ratio (SNR) for the first subcarrier and a first differential SNR for the second subcarrier.

The first differential SNR is an SNR difference between adjacent subcarriers included in the feedback subcarrier.

That is, the first SNR for the first subcarrier cannot be set to the differential SNR since the first subcarrier does not have a comparison target. Therefore, the SNR value may be fed back for the first subcarrier, and the differential SNR may be fed back from the second subcarrier which is a feedback subcarrier excluding the first subcarrier. That is, the feedback subcarrier included in the second subcarrier is used to feed back the SNR difference between the adjacent subcarriers, thereby decreasing the number of feedback bits.

Specifically, the first SNR may be acquired for a space-time stream by using the equation below.

$$D\_SNR_{scidx(0),i} = 10\log_{10}\left(\frac{\|H_{scidx(0)}V_{scidx(0),i}\|^2}{N}\right)$$

$H_{scidx(0)}$ may be an estimated MIMO channel for the first subcarrier.

$V_{scidx(0),i}$ may be a column i of a beamforming matrix V for the first subcarrier.

i may be an index of the space-time stream.

N may be an average noise plus interference power, measured from the first STA.

scidx(0) is a first subcarrier index which may be expressed as a subcarrier index 1, and may be a subcarrier index of the first subcarrier.

The first SNR may have a granularity of 0.25 dB, a minimum value of −8 dB, and a maximum value of 55.75 dB. The first SNR may be quantized with 8 bits based on the granularity, the minimum value, and the maximum value. The first SNR may be indicated by a value in the range of −8 dB to 55.75 dB with a 0.25 dB step by using the 8 bits.

The first differential SNR may be acquired for a space-time stream based on the equation below.

$$D_{SNR_{k,i}} = 10\log_{10}\left(\frac{\|H_k V_{k,i}\|^2}{N}\right) - 10\log_{10}\left(\frac{\|H_{k-1} V_{k-1,i}\|^2}{N}\right)$$

k may be a subcarrier index of the second subcarrier.

$H_k$ may be an estimated MIMO channel for a feedback subcarrier k.

$V_{k,i}$ may be a column i of a beamforming matrix V for the feedback subcarrier k.

i may be an index of the space-time stream.

N may be an average noise plus interference power, measured from the first STA.

The first differential SNR may have a granularity of 1 dB, a minimum value of −8 dB, and a maximum value of 7 dB. The first differential SNR may be quantized with 4 bits based on the granularity, the minimum value, and the maximum value. The first differential SNR may be indicated by a value in the range of −8 dB to 7 dB with a 1 dB step by using the 4 bits An embodiment of the first differential SNR is described below in detail.

If a subcarrier index of the first subcarrier is 1, the second subcarrier may include a third subcarrier of which a subcarrier index is 2 and a fourth subcarrier of which a subcarrier index is 3.

A second differential SNR for the third subcarrier may be an SNR difference between the first subcarrier and the third subcarrier. The second differential SNR may be acquired based on the equation above when k=2. The equation above may be Equation 3 or 4. Specifically, the second differential SNR may be set to an SNR difference value between the first SNR and the second SNR for the third subcarrier. However, the SNR difference value may be limited in the range of the minimum value (−8 dB) to the maximum value (7 dB).

A third differential SNR for the fourth subcarrier may be an SNR difference between the second subcarrier and the third subcarrier. The third differential SNR may be acquired based on the equation above when k=3. The equation above may be Equation 3 or 4. Specifically, the third differential SNR may be set to an SNR difference value between the second SNR and the third SNR for the fourth subcarrier. However, the SNR difference value may be limited in the range of the minimum value (−8 dB) to the maximum value (7 dB).

The fourth subcarrier may be a feedback subcarrier spaced apart from the third subcarrier by the grouping value.

That is, in the feedback subcarrier having a spacing of the grouping value, an SNR may be measured for each subcarrier. The SNR value may be directly fed back for the first subcarrier transmitted first among the feedback subcarriers, and an SNR difference between adjacent subcarriers may be fed back starting from the second subcarrier.

The predetermined frequency band may be set for a single channel, two bonded channels, three bonded channels, or four bonded channels, The grouping value may be set to one of values 2, 4, 8, and 16.

6. Device Configuration

Figure 20:
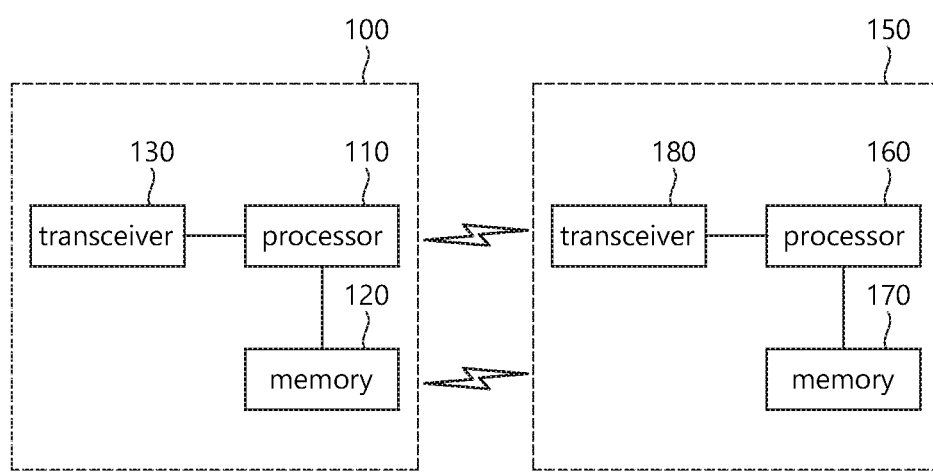
FIG. 20 is a diagram describing a device for implementing the above-described method.

FIG. 20 is a diagram describing a device for implementing the above-described method.

A wireless device (100) of FIG. 20 may correspond to an initiator STA, which transmits a signal that is described in the description presented above, and a wireless device (150) may correspond to a responder STA, which receives a signal that is described in the description presented above. At this point, each station may correspond to a 11ay device (or user equipment (UE)) or a PCP/AP. Hereinafter, for simplicity in the description of the present invention, the initiator STA transmits a signal is referred to as a transmitting device (100), and the responder STA receiving a signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement functions, processes, and/or methods proposed in the present specification. For example, the processor (110, 160) may perform the aforementioned operation according to the present embodiment.

The processor 110 of the transmitting device operates as follows. The processor 110 of the transmitting device generates a feedback frame based on multi user (MU)-multi input multi output (MIMO) beamforming, and transmits the feedback frame.

The processor 160 of the receiving device operates as follows. The processor 160 of the receiving device receives the feedback frame generated in the transmitting device, and transmits data based on the feedback frame.

Figure 21:
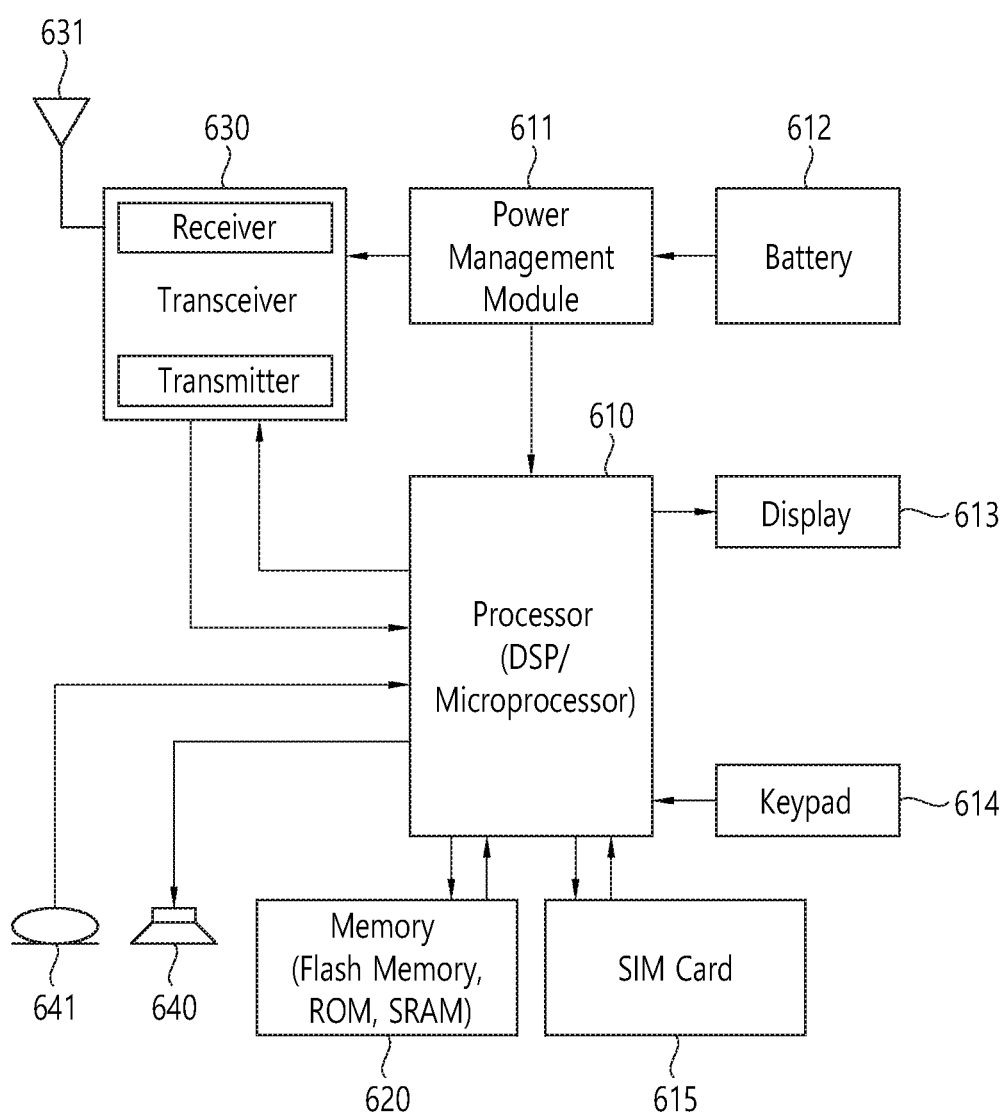
FIG. 21 shows more detailed wireless device to implement an embodiment of the present invention.

FIG. 21 shows more detailed wireless device to implement an embodiment of the present invention. The present invention described above for the transmitting device or the receiving device may be applied to this embodiment.

A wireless device includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods described in this description. Layers of the radio interface protocol may be implemented in the processor 610. The processor 610 may include ASIC, other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

In case of the transmitting device, the processor 610 generates a feedback frame based on multi user (MU)-multi input multi output (MIMO) beamforming, and transmits the feedback frame.

In case of the receiving device, the processor 610 of the receiving device receives the feedback frame generated in the transmitting device, and transmits data based on the feedback frame.

The feedback frame may be defined as follows.

The feedback frame includes information related to a feedback subcarrier for a predetermined frequency band and a beamforming report field for the MU-MIMO beamforming.

The feedback subcarrier includes a first subcarrier transmitted first in the feedback subcarrier and a second subcarrier of which a subcarrier index is determined based on a grouping value related to a subcarrier spacing. The second subcarrier may be a feedback subcarrier excluding the first subcarrier.

The first subcarrier is set to one of a left edge subcarrier or right edge subcarrier of the predetermined frequency band.

The beamforming report field includes a first signal to noise ratio (SNR) for the first subcarrier and a first differential SNR for the second subcarrier.

The first differential SNR is an SNR difference between adjacent subcarriers included in the feedback subcarrier.

That is, the first SNR for the first subcarrier cannot be set to the differential SNR since the first subcarrier does not have a comparison target. Therefore, the SNR value may be fed back for the first subcarrier, and the differential SNR may be fed back from the second subcarrier which is a feedback subcarrier excluding the first subcarrier. That is, the feedback subcarrier included in the second subcarrier is used to feed back the SNR difference between the adjacent subcarriers, thereby decreasing the number of feedback bits.

Specifically, the first SNR may be acquired for a space-time stream by using the equation below.

$$D\_SNR_{scidx(0),i} = 10\log_{10}\left(\frac{\|H_{scidx(0)}V_{scidx(0),i}\|^2}{N}\right)$$

$H_{scidx(0)}$ may be an estimated MIMO channel for the first subcarrier.

$V_{scidx(0),i}$ may be a column i of a beamforming matrix V for the first subcarrier.

i may be an index of the space-time stream.

N may be an average noise plus interference power, measured from the first STA.

scidx(0) is a first subcarrier index which may be expressed as a subcarrier index 1, and may be a subcarrier index of the first subcarrier.

The first SNR may have a granularity of 0.25 dB, a minimum value of −8 dB, and a maximum value of 55.75 dB. The first SNR may be quantized with 8 bits based on the granularity, the minimum value, and the maximum value. The first SNR may be indicated by a value in the range of −8 dB to 55.75 dB with a 0.25 dB step by using the 8 bits.

The first differential SNR may be acquired for a space-time stream based on the equation below.

$$D_{SNR_{k,i}} = 10\log_{10}\left(\frac{\|H_k V_{k,i}\|^2}{N}\right) - 10\log_{10}\left(\frac{\|H_{k-1} V_{k-1,i}\|^2}{N}\right)$$

k may be a subcarrier index of the second subcarrier.

$H_k$ may be an estimated MIMO channel for a feedback subcarrier k.

$V_{k,i}$ may be a column i of a beamforming matrix V for the feedback subcarrier k.

i may be an index of the space-time stream.

N may be an average noise plus interference power, measured from the first STA.

The first differential SNR may have a granularity of 1 dB, a minimum value of −8 dB, and a maximum value of 7 dB. The first differential SNR may be quantized with 4 bits based on the granularity, the minimum value, and the maximum value. The first differential SNR may be indicated by a value in the range of −8 dB to 7 dB with a 1 dB step by using the 4 bits An embodiment of the first differential SNR is described below in detail.

If a subcarrier index of the first subcarrier is 1, the second subcarrier may include a third subcarrier of which a subcarrier index is 2 and a fourth subcarrier of which a subcarrier index is 3.

A second differential SNR for the third subcarrier may be an SNR difference between the first subcarrier and the third subcarrier. The second differential SNR may be acquired based on the equation above when k=2. The equation above may be Equation 3 or 4. Specifically, the second differential SNR may be set to an SNR difference value between the first SNR and the second SNR for the third subcarrier. However, the SNR difference value may be limited in the range of the minimum value (−8 dB) to the maximum value (7 dB).

A third differential SNR for the fourth subcarrier may be an SNR difference between the second subcarrier and the third subcarrier. The third differential SNR may be acquired based on the equation above when k=3. The equation above may be Equation 3 or 4. Specifically, the third differential SNR may be set to an SNR difference value between the second SNR and the third SNR for the fourth subcarrier. However, the SNR difference value may be limited in the range of the minimum value (−8 dB) to the maximum value (7 dB).

The fourth subcarrier may be a feedback subcarrier spaced apart from the third subcarrier by the grouping value.

That is, in the feedback subcarrier having a spacing of the grouping value, an SNR may be measured for each subcarrier. The SNR value may be directly fed back for the first subcarrier transmitted first among the feedback subcarriers, and an SNR difference between adjacent subcarriers may be fed back starting from the second subcarrier.

The predetermined frequency band may be set for a single channel, two bonded channels, three bonded channels, or four bonded channels, The grouping value may be set to one of values 2, 4, 8, and 16.

What is claimed is:

1. A station (STA) in a wireless local area network (WLAN) system, the STA comprising:
a memory;
a transceiver; and
a processor operatively coupled to the memory and the transceiver, wherein the processor is configured to:
receive a feedback frame generated based on multi user (MU)-multi input multi output (MIMO) beamforming from another STA; and
decode the feedback frame,
wherein the feedback frame includes first information on feedback subcarriers and second information on a beamforming report field,
wherein the feedback subcarriers include a first subcarrier and second subcarriers,
wherein the beamforming report field includes a first signal to noise ratio (SNR) for the first subcarrier and a first differential SNR for the second subcarriers, and
wherein the first differential SNR is an SNR difference between adjacent subcarriers included in the feedback subcarriers.

2. The STA of claim 1,
wherein the feedback subcarriers are included within a predetermined frequency band,
wherein the first subcarrier is transmitted first in the feedback subcarrier,
wherein a subcarrier spacing between the second subcarriers is determined based on a grouping value, and
wherein the first subcarrier is set to one of a left edge subcarrier or right edge subcarrier of the predetermined frequency band.

3. The STA of claim 2, wherein the first SNR is acquired for a space-time stream based on the equation:

$$D\_SNR_{scidx(0),i} = 10\log_{10}\left(\frac{\|H_{scidx(0)}V_{scidx(0),i}\|^2}{N}\right)$$

where $H_{scidx(0)}$ is an estimated MIMO channel for the first subcarrier,
$V_{scidx(0),i}$ is a column i of a beamforming matrix V for the first subcarrier,
i is an index of the space-time stream, and
N is an average noise plus interference power, measured from the first STA.

4. The STA of claim 3,
wherein the first SNR has a granularity of 0.25 dB, a minimum value of −8 dB, and a maximum value of 55.75 dB, and
wherein the first SNR is quantized with 8 bits based on the granularity, the minimum value, and the maximum value.

5. The STA of claim 2, wherein the first differential SNR is acquired for a space-time stream based on the equation:

$$D_{SNR_{k,i}} = 10\log_{10}\left(\frac{\|H_k V_{k,i}\|^2}{N}\right) - 10\log_{10}\left(\frac{\|H_{k-1} V_{k-1,i}\|^2}{N}\right),$$

where k is a subcarrier index of the second subcarrier,
$H_k$ is an estimated MIMO channel for a feedback subcarrier k,
$V_{k,i}$ is a column i of a beamforming matrix V for the feedback subcarrier k,
i is an index of the space-time stream, and
N is an average noise plus interference power, measured from the first STA.

6. The STA of claim 5,
wherein the first differential SNR has a granularity of 1 dB, a minimum value of −8 dB, and a maximum value of 7 dB, and
wherein the first differential SNR is quantized with 4 bits based on the granularity, the minimum value, and the maximum value.

7. The STA of claim 5,
wherein if a subcarrier index of the first subcarrier is 1, the second subcarriers include a third subcarrier of which a subcarrier index is 2 and a fourth subcarrier of which a subcarrier index is 3,
wherein the first differential SNR includes a second differential SNR for the third subcarrier and a third differential SNR for the fourth subcarrier
wherein the second differential SNR is an SNR difference between the first subcarrier and the third subcarrier,
wherein the second differential SNR is acquired based on the equation when k=2,
wherein the third differential SNR is an SNR difference between the third subcarrier and the fourth subcarrier, and
wherein the third differential SNR is acquired based on the equation when k=3.

8. The STA of claim 7, wherein the fourth subcarrier is a feedback subcarrier spaced apart from the third subcarrier by the grouping value.

9. The STA of claim 1,
wherein the predetermined frequency band is set for a single channel, two bonded channels, three bonded channels, or four bonded channels,
wherein the grouping value is set to one of values 2, 4, 8, and 16, and
wherein the second subcarriers are feedback subcarriers excluding the first subcarrier.

* * * * *